United States Patent [19]

Kintner

[11] 4,227,247

[45] Oct. 7, 1980

[54] INTEGRATED CIRCUIT CONTROLLER PROGRAMMABLE WITH UNIDIRECTIONAL-LOGIC INSTRUCTIONS REPRESENTATIVE OF SEQUENTIAL WIRE NODES AND CIRCUIT ELEMENTS OF A LADDER DIAGRAM

[75] Inventor: Paul M. Kintner, Bayside, Wis.

[73] Assignee: Eaton Corporation, Cleveland, Ohio

[21] Appl. No.: 841,431

[22] Filed: Oct. 12, 1977

[51] Int. Cl.³ .................... G06F 9/06; G05B 11/01
[52] U.S. Cl. .................................. 364/900; 364/104
[58] Field of Search ... 364/200 MS File, 900 MS File, 364/104, 107, 200, 900

[56] References Cited

U.S. PATENT DOCUMENTS

| | | | |
|---|---|---|---|
| 3,827,030 | 7/1974 | Seipp | 364/900 |
| 3,875,391 | 4/1975 | Shapiro et al. | 364/200 X |
| 3,940,742 | 2/1976 | Hudspeth et al. | 364/900 |
| 3,944,987 | 3/1976 | Koyanagi et al. | 364/900 |
| 3,953,834 | 4/1976 | Burkett et al. | 364/900 |
| 3,953,834 | 4/1976 | Burkett et al. | 364/900 |
| 3,964,026 | 6/1976 | Yamauchi et al. | 364/900 |
| 3,975,622 | 8/1976 | Horn et al. | 364/900 X |
| 4,021,783 | 5/1977 | Highberger | 364/900 |
| 4,051,326 | 9/1977 | Badagnani et al. | 364/900 X |
| 4,078,259 | 3/1978 | Soulsby et al. | 364/900 |

Primary Examiner—Gareth D. Shaw
Assistant Examiner—Thomas M. Heckler

Attorney, Agent, or Firm—Hugh R. Rather; William A. Autio

[57] ABSTRACT

A programmable controller that is programmed to simulate a ladder diagram and accepts input signals to control output devices in accordance with the ladder diagram program and comprising, in addition to a main memory that stores the program, a logic processor and input/output circuits, of a special wire number memory and a control coil memory for receiving, storing and making available to the processor the result of every logic function representing the current on-off status of each wire node and each control coil and associated contacts. This controller affords the maintenance of a complete current record of the changing status of the contacts and their interconnecting circuit nodes. This makes possible a particularly simple unidirectional-logic programming mode because the programmer does not have to keep track of which logic operations must be temporarily stored. This storage affords a powerful monitoring means in that signal tracing can be accomplished by merely calling up predetermined wire numbers from the special wire number memory and displaying the status thereof, or calling up predetermined input devices or control coils to view the status thereof. Moreover, for maintenance purposes, this architecture provides a selector switch and logic circuitry whereby a predetermined wire node may be manually forced "on" or "off" for maintenance purposes or the like.

21 Claims, 20 Drawing Figures

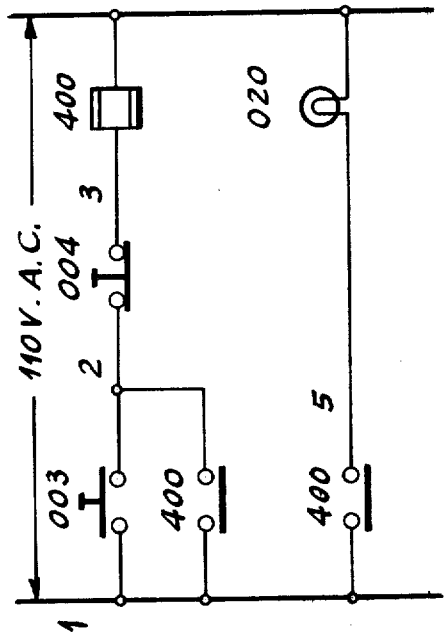
Fig. 1
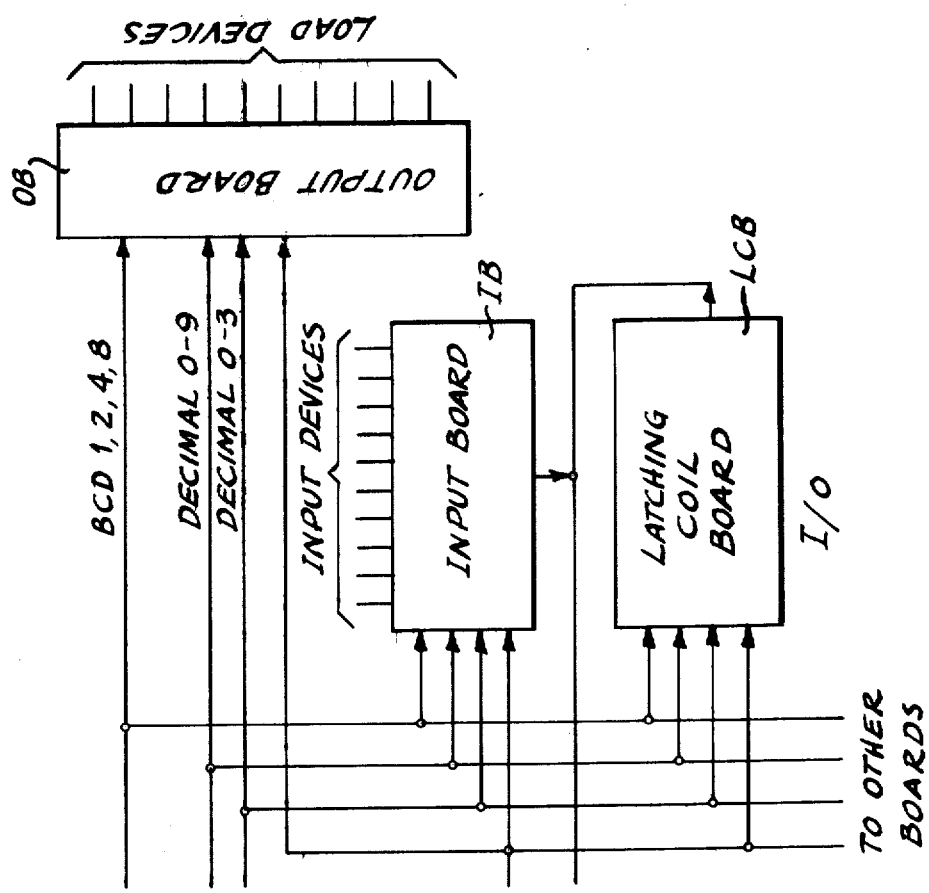
Fig. 10
Fig. 8b

Fig. 11

| MEMORY CHIP GROUP | FUNCTION | MAIN MEMORY ADDRESSING | | | | | | | | | | OSC PULSE | WORDS | | | |
|---|---|---|---|---|---|---|---|---|---|---|---|---|---|---|---|---|
| | | ADDRESS GEN. COUNTER OUTPUT | | | | | | | | CHIP SELECT | | | | | | |
| | | MEMORY LOCATION | | | | | | | | | | | | | | |
| | | Q10 | Q9 | Q8 | Q7 | Q6 | Q5 | Q4 | Q3 | Q2 | Q1 | | | | | |
| | F0 FIELD | 0 | 0 | 0 | 0 | 0 | 0 | 0 | 0 | 0 | 0 | 0 | | | | |
| 1ST CHIP GROUP | READ F1 WORD | 0 | 0 | 0 | 0 | 0 | 0 | 0 | 0 | 0 | 1 | 1 | 0 | 0 | 1 | |
| 2ND CHIP GROUP | READ F2 WORD | 0 | 0 | 0 | 0 | 0 | 0 | 0 | 0 | 1 | 0 | 2 | 0 | 0 | 3 | 0 |
| 3RD CHIP GROUP | READ F3 WORD | 0 | 0 | 0 | 0 | 0 | 0 | 0 | 0 | 1 | 1 | 3 | | SC | | |
| | F0 FIELD | 0 | 0 | 0 | 0 | 0 | 0 | 0 | 1 | 0 | 0 | 4 | | | | |
| 1ST CHIP GROUP | READ F1 WORD | 0 | 0 | 0 | 0 | 0 | 0 | 0 | 1 | 0 | 1 | 5 | 0 | 0 | 1 | |
| 2ND CHIP GROUP | READ F2 WORD | 0 | 0 | 0 | 0 | 0 | 0 | 0 | 1 | 1 | 0 | 6 | 4 | 0 | 0 | |
| 3RD CHIP GROUP | READ F3 WORD | 0 | 0 | 0 | 0 | 0 | 0 | 0 | 1 | 1 | 1 | 7 | 0 | 0 | 2 | |
| | F0 FIELD | 0 | 0 | 0 | 0 | 0 | 0 | 1 | 0 | 0 | 0 | 8 | | | | |
| 1ST CHIP GROUP | READ F1 WORD | 0 | 0 | 0 | 0 | 0 | 0 | 1 | 0 | 0 | 1 | 9 | 0 | 0 | 2 | |
| 2ND CHIP GROUP | READ F2 WORD | 0 | 0 | 0 | 0 | 0 | 0 | 1 | 0 | 1 | 0 | 10 | 0 | 0 | 4 | 0 |
| 3RD CHIP GROUP | READ F3 WORD | 0 | 0 | 0 | 0 | 0 | 0 | 1 | 0 | 1 | 1 | 11 | 0 | 0 | 3 | |
| | F0 FIELD | 0 | 0 | 0 | 0 | 0 | 0 | 1 | 1 | 0 | 0 | 12 | | | | |
| 1ST CHIP GROUP | READ F1 WORD | 0 | 0 | 0 | 0 | 0 | 0 | 1 | 1 | 0 | 1 | 13 | 0 | 0 | 3 | |
| 2ND CHIP GROUP | READ F2 WORD | 0 | 0 | 0 | 0 | 0 | 0 | 1 | 1 | 1 | 0 | 14 | | SC | | |
| 3RD CHIP GROUP | READ F3 WORD | 0 | 0 | 0 | 0 | 0 | 0 | 1 | 1 | 1 | 1 | 15 | 4 | 0 | 0 | |
| | F0 FIELD | 0 | 0 | 0 | 0 | 0 | 1 | 0 | 0 | 0 | 0 | 16 | | | | |
| 1ST CHIP GROUP | READ F1 WORD | 0 | 0 | 0 | 0 | 0 | 1 | 0 | 0 | 0 | 1 | 17 | 0 | 0 | 1 | |
| 2ND CHIP GROUP | READ F2 WORD | 0 | 0 | 0 | 0 | 0 | 1 | 0 | 0 | 1 | 0 | 18 | 4 | 0 | 0 | 0 |
| 3RD CHIP GROUP | READ F3 WORD | 0 | 0 | 0 | 0 | 0 | 1 | 0 | 0 | 1 | 1 | 19 | 0 | 0 | 5 | |
| | F0 FIELD | 0 | 0 | 0 | 0 | 0 | 1 | 0 | 1 | 0 | 0 | 20 | | | | |
| 1ST CHIP GROUP | READ F1 WORD | 0 | 0 | 0 | 0 | 0 | 1 | 0 | 1 | 0 | 1 | 21 | 0 | 0 | 5 | |
| 2ND CHIP GROUP | READ F2 WORD | 0 | 0 | 0 | 0 | 0 | 1 | 0 | 1 | 1 | 0 | 22 | | SC | | |
| 3RD CHIP GROUP | READ F3 WORD | 0 | 0 | 0 | 0 | 0 | 1 | 0 | 1 | 1 | 1 | 23 | 0 | 2 | 0 | |
| | | 1 | 1 | 1 | 1 | 1 | 1 | 1 | 1 | 1 | 1 | 255 | | | | |

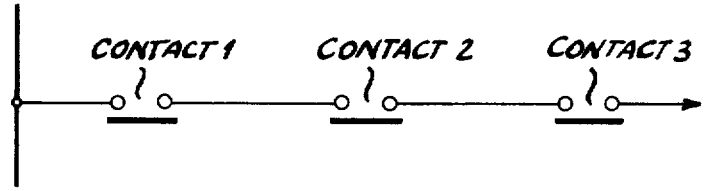

Fig. 2

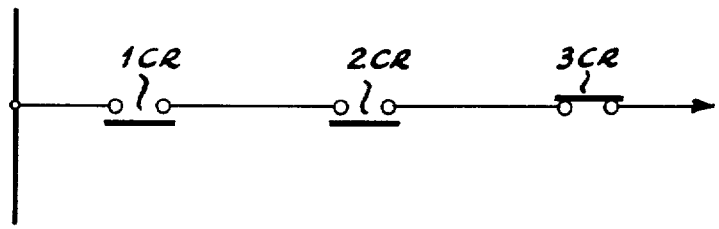

Fig. 3

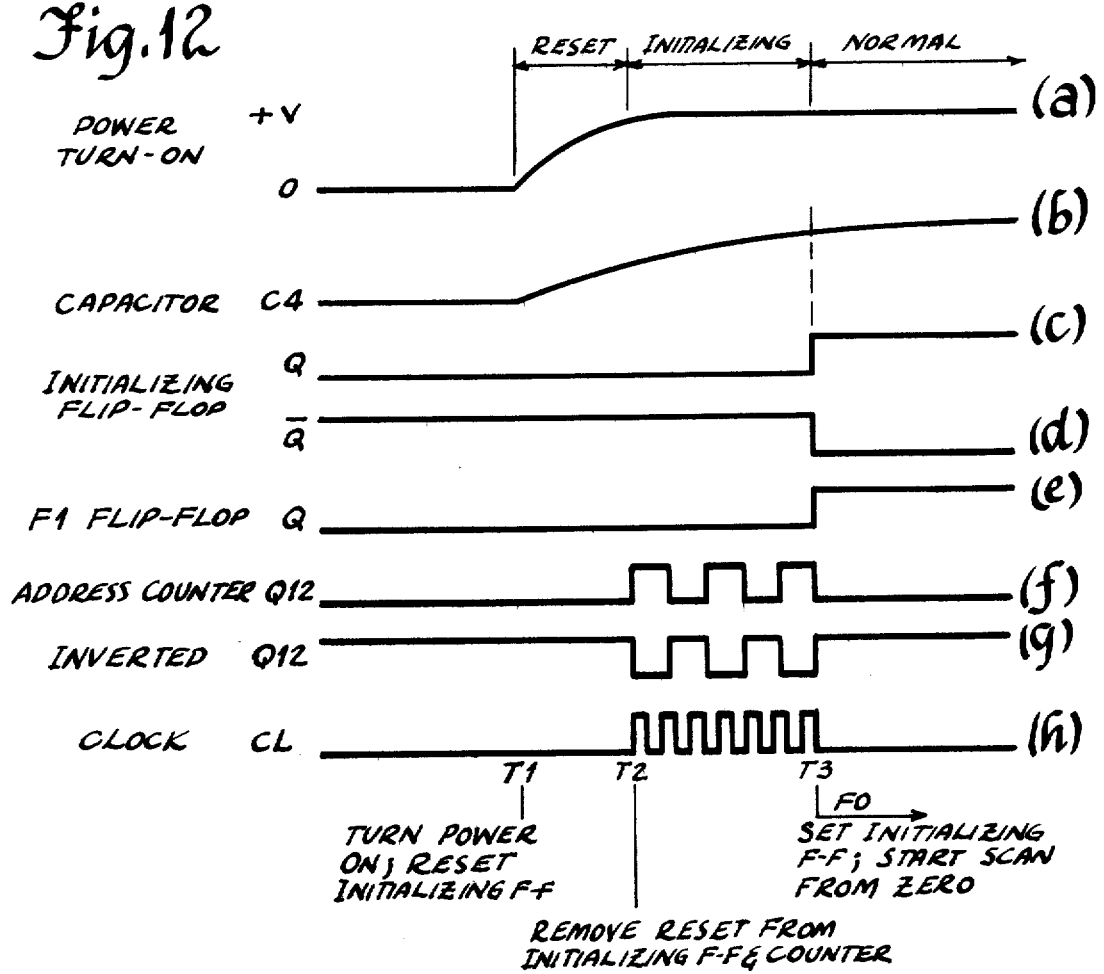
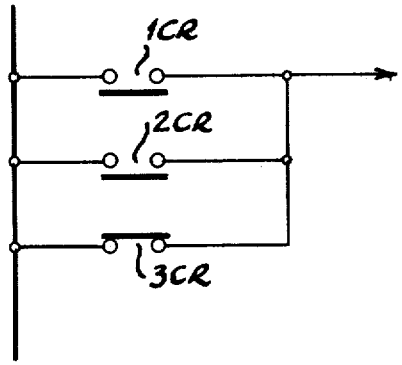
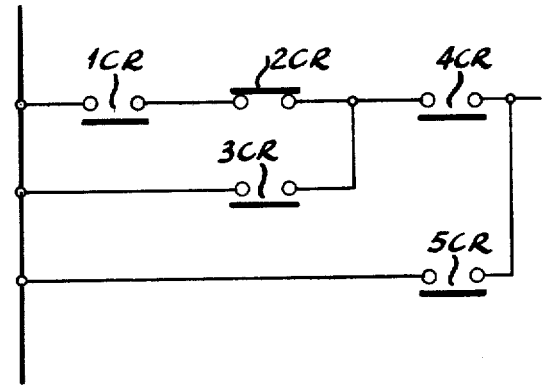

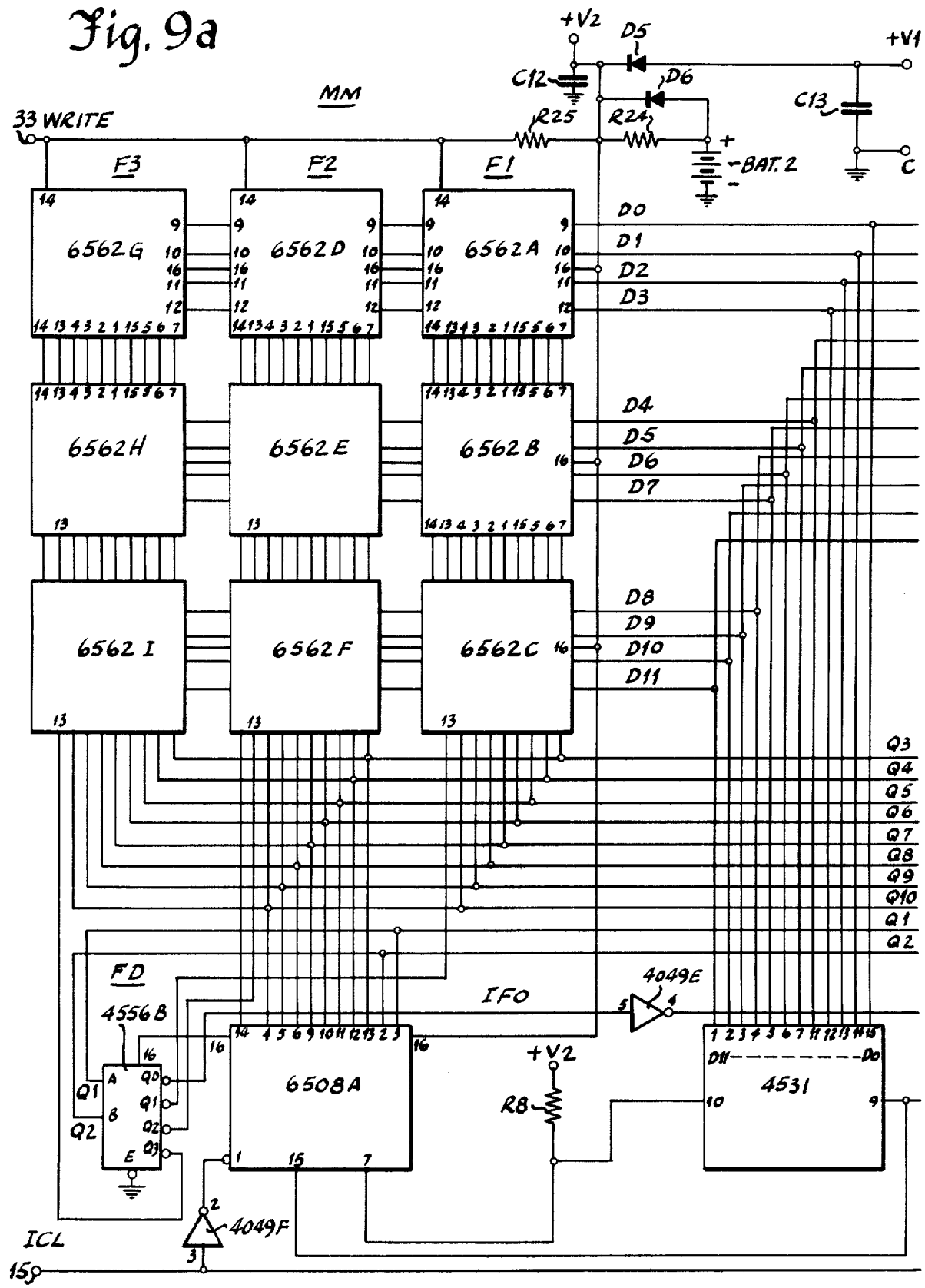

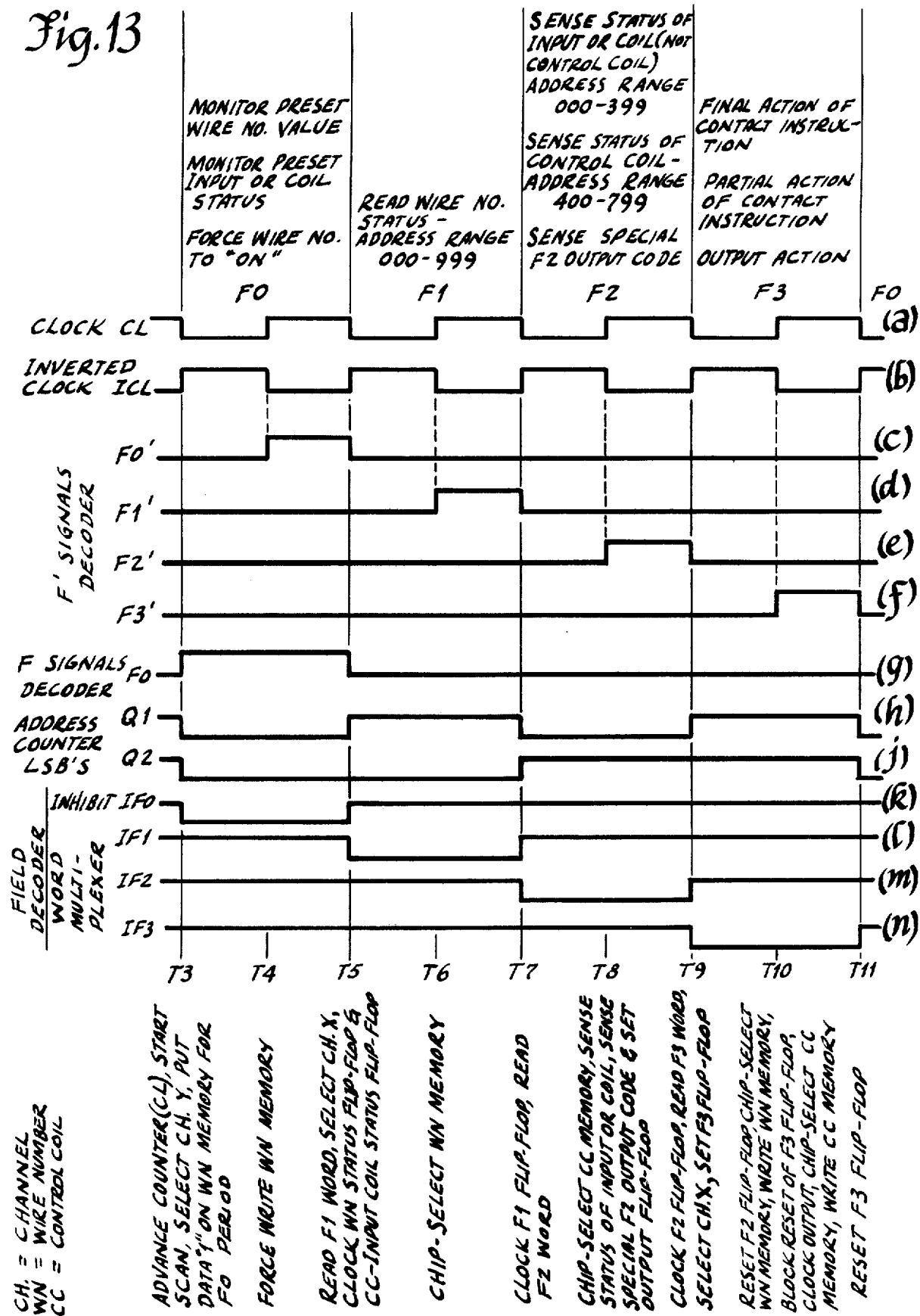

INTEGRATED CIRCUIT CONTROLLER PROGRAMMABLE WITH UNIDIRECTIONAL-LOGIC INSTRUCTIONS REPRESENTATIVE OF SEQUENTIAL WIRE NODES AND CIRCUIT ELEMENTS OF A LADDER DIAGRAM

BACKGROUND OF THE INVENTION

The task of a programmable controller is to compute the logic status represented by interconnected contacts and to apply the end result of such logic computation to a coil to either energize or deenergize it or to send such result to the outside to control external devices such as solenoids, for example.

This logic and the interconnected contacts represented thereby is illustrated by a diagram. The convention used in such diagram is based on the standard practice used to represent electro-mechanical relay logic and is retained in programmable controller applications because of the widespread familiarity with this type of diagram, commonly termed a "ladder diagram" because each set of logic that corresponds to one output resembles the rung of a ladder. That is, in a ladder diagram, the left and right verticals are the power lines and the horizontal "rungs" are the sets of logic representing the control elements such as interconnected contacts as shown in FIG. 1.

In an electro-mechanical relay ladder diagram, the direction of logic is from the left hand vertical 110 volt A.C. power line flowing through the contacts and coils to the right hand vertical power line. The programmable controller emulates this action, but there are quite significant differences between the internal functions of the programmable controller and the relay system that it replaces. Among these are:

1. In the relay system, the logic actions occur in parallel or simultaneously through the "rungs" of the ladder. In the programmable controller, these logic actions are computed sequentially, one contact at a time.

2. In the programmable controller, the external contacts are not an actual part of the logic, as are the pushbuttons and limit switches of the relay system, but rather power signals therefrom are brought into the programmable controller and then "relayed" through isolators to become input signals. The programmable controller then treats these external contacts in the same manner as internal contacts except as controlled by an input signal rather than by a coil.

3. There are no L1 and L2 power lines for the logic section of the control even though two vertical lines may be drawn on a programmable controller diagram. In the latter, there is a logic flow from the left line to the right line rather than a power flow as in the relay system ladder diagram.

4. In the programmable controller, the results of logic actions are "relayed" out through such devices as photo-isolators and Triacs in order to control external devices.

In view of the above, the functions of programmable controllers can be actually grouped into three sections: (1) the input section consisting of the power source from line L1-L2 and connections through limit switches and pushbuttons to the input termianls of the controller; (2) the logic section based on internal processing resembling to a great degree computer-like functions; and (3) the output section where logic function results control external devices connected to the output terminals of the controller and power lines L1-L2.

As stated previously, the logic task consists of determining the state of a signal coming from a set of interconnected contacts, based both on how the contacts are interconnected and the states of the individual contacts, open or closed. There are only two basic contact connections to be considered: the series connection and the parallel connection. FIG. 2 shows the series connection. The logic action is: a logic signal will flow from left to right and be present at the "output" if, and only if, all three contacts are closed. This is the equivalent of an AND-logic operation, that is a logic "1" is obtained if Contact-1 and Contact-2 and Contact-3 are closed.

But more precisely, one does not think in terms of contacts being open or closed but rather whether the devices controlling the contacts are energized or deenergized. This leads to the concept of normally-open and normally-closed contacts. FIG. 3 shows three contacts where reference is made to the control coils controlling the contacts and where that contact controlled by coil 3CR is normally-closed. The logic action is now described as follows: a logic "1" signal is obtained if, and only if, coils 1CR and 2CR are energized and coil 3CR is deenergized. The logic equivalent of labeling a contact as normally closed is the NOT-logic operation.

The parallel connection is shown in FIG. 4. Here, the logic action is: a logic output of "1" is obtained if, and only if, either coil 1CR or 2CR is energized or if coil 3CR is deenergized. This is commonly regarded as equivalent to the logic-OR operation.

Programmable controllers compute the logic represented by series and parallel contacts through sequential instructions placed into a memory. Each instruction has a portion indicating the type of operation to be performed, series or parallel, and a reference number defining where the internal processor is to go to find the status of the device (input or coil) controlling the contact. The programmer must determine and write these instructions according to the manner in which the contacts are interconnected.

Programming is quite simple for contacts in series. One could write three instructions for the logic of FIG. 3 thus:

SERIES N.O. 1CR
SERIES N.O. 2CR
SERIES N.C. 3CR where "SERIES" indicates the type of internal action to be performed, actually an AND-logic operation, and 1CR, 2CR and 3CR are the "reference numbers" for the internal control coils energizing the "contacts". As seen, the instructions are also "tagged" N.O. or N.C., meaning normally-open and normally-closed.

Programming is also simple for the parallel connection of FIG. 4 where one would write:

OR N.O. 1CR
OR N.O. 2CR
OR N.C. 3CR

Programming simplicity, however, can be retained when series and parallel operations are intermixed only if all paralleled contacts are connected to the left line as illustrated in FIG. 5. The instructions for this example would be:

SERIES N.O. 1CR
SERIES N.C. 2CR
OR N.O. 3CR
SERIES N.O. 4CR
OR N.O. 5CR

The early prior art controllers required parallel contacts to be connected in this fashion; most of the small ones still do. This means that a diagram such as FIG. 6 must be modified as shown in FIG. 7 by introducing a coil to get the single contact going to the left line since you can "OR" only a single contact with the previous result. The added elements increase the cost.

It is desirable to have a programming means which accommodates such configurations as FIG. 6 without requiring the user to modify his diagram. This could be done if means within the processor were provided to store and retrieve the partial results of the logic operation. The program for FIG. 6 might then be written:

SERIES N.O. 1CR
STORE T1
SERIES N.O. 2CR
SERIES N.O. 3CR
STORE T2
RETRIEVE T1
SERIES N.O. 4CR
SERIES N.O. 5CR
OR T2

The action is as follows: at the first branch, it is recognized that one will have to come back later and compute the alternative parallel branch. Accordingly, the logic value at that point is stored in location T1 of the memory present for this purpose. When the first branch has been traversed, the logic value at this point is also stored in location T2. The programmer then backs up and retrieves the value in location T1 to start the second branch. The result at the end of the second branch is OR'd with the value in location T2.

The procedure outlined is available in certain prior art large controllers and in at least one small controller. The large controllers provide cathode-ray tube diagram monitors which simplify the task of storing and retrieving temporary logic results. However, programming can become difficult without such aids when diagrams become complex, for the programmer must then keep track of a number of temporary results, storing and retrieving them as required. It is especially difficult for maintenance men to grasp the logic being performed by a list of instructions as given above. Accordingly, it is desirable to provide improved means that are simple and easy to program and does not require any diagram modification.

SUMMARY OF THE INVENTION

An object of the invention is to provide an improved programmable controller.

A more specific object of the invention is to provide a programmable controller with improved central processor apparatus that renders programming of a ladder diagram simple and easy without requiring modification of the ladder diagram for programming purposes.

Another specific object of the invention is to provide a programmable controller with improved central processor apparatus that stores the result of each and every logic function and the status of every control coil whereby the programmer need not keep track of which logic function results have been stored and which have not.

Another specific object of the invention is to provide a programmable controller with improved central processor apparatus that uses unidirectional-logic instructions and stores the status of each wire number of a ladder diagram thereby to render programming simple and straightforward.

Another specific object of the invention is to provide a programmable controller with improved means for storing the logic values of the circuit nodes of a ladder diagram and for computing and updating the logic values of these circuit nodes based on the previous values stored and input signals.

Another specific object of the invention is to provide a programmable controller with improved ladder diagram processing means comprising a wire number memory and means for periodically updating the wire number memory based on the previous status of the wire number memory storage and inputs.

Another specific object of the invention is to provide a programmable controller with improved means for outputting a given wire number status to an output.

Another specific object of the invention is to provide a programmable controller with improved means for forcing "on" or "off" any wire number under manual control thereby to observe the performance of the outputs or set up latching relays when restarting from an interrupted condition.

Another specific object of the invention is to provide a programmable controller with improved means including wired-in logic means setting a state indicative to the processor that the left-hand vertical power conductor of a ladder diagram is always in the "on" state thereby to avoid the necessity of a special instruction therefor.

Another specific object of the invention is to provide a programmable controller with a logic function processing circuit consisting primarily of a combination of three flip-flops and clock control for performing AND logic functions and controlling storage of the results thereof and in addition thereto an inhibit logic circuit for performing OR logic functions and controlling storage of the results thereof.

Another specific object of the invention is to provide a programmable controller with improved initial-power-on control means for holding the logic circuits in a reset or "0" output condition when power is first turned on and then when power is fully on, controlling the processor to be clocked so that it will start at the beginning of an address scan rather than on a random time basis.

Another specific object of the invention is to provide a programmable controller with improved programming means affording programming a series "rung" of a ladder diagram in partial overlapping sequence with respect to wire numbers and contacts in logic terms such that the state of a second wire number is the logic AND result of the states of a first wire number and first contact, the state of a third wire number is the logic AND result of the states of said second wire number and a second contact, etc.

Another specific object of the invention is to provide a programmable controller with improved programming means affording programming all but the last of a set of parallel contacts connected to an output wire number such that the output wire number can be set to an "on" state by any of the parallel contact instructions and final action is inhibited until the last parallel contact instruction has been processed thereby to obtain an OR-logic result.

Another specific object of the invention is to provide a programmable controller of the aforementioned type with improved means for storing the results of all of its AND and OR logic functions for use in subsequent logic operations.

Other objects and advantages of the invention will hereinafter appear.

BRIEF DESCRIPTION OF THE DRAWINGS

FIG. 1 shows a standard relay ladder diagram of an electrical system for turning a lamp on and off;

FIG. 2 is a diagram showing series normally-open contacts representing an AND-logic function;

FIG. 3 is a diagram showing a series connection of normally-open contacts and a normally-closed contact representing an AND-logic function which includes a NOT logic function represented by the normally-closed condition of the contact;

FIG. 4 is a diagram showing a parallel connection of normally-open contacts and a normally-closed contact representing an OR-logic function which includes a NOT logic function represented by the normally-closed condition of the contact;

FIG. 5 is a diagram showing series and parallel connection of normally-open contacts and a normally-closed contact representing AND and OR-logic functions wherein all paralleled contacts connect to the left power line of the ladder diagram;

FIG. 8a–b is a block diagram showing generally the architecture of the programmable controller according to the invention;

FIG. 9a–g is a logic diagram showing in detail the construction of the programmable controller of FIGS. 8a–b;

FIG. 10 is a table showing in decimal form how the ladder diagram of FIG. 1 may be programmed into the main memory of the cotroller;

FIG. 11 is a table showing how the main memory may be addressed to read out the program of FIG. 10 therefrom;

FIG. 12 is a graph showing initial power on operating characteristics of the controller of FIG. 9a–g; and FIG. 13 is a timing chart showing operating characteristics of the programmable controller of FIGS. 9a–g.

DESCRIPTION OF THE BLOCK DIAGRAM

Figure 6:
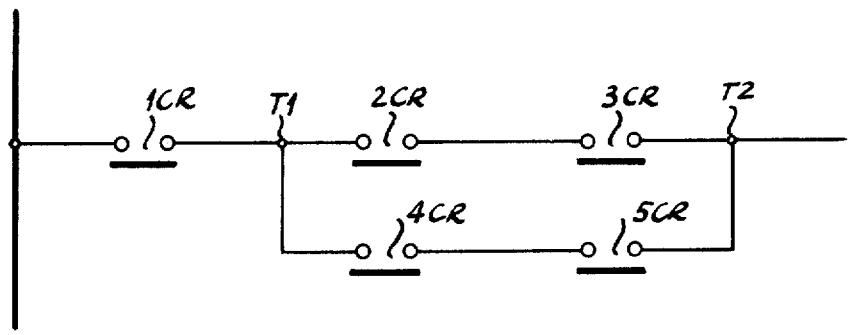
FIG. 6 is a diagram showing series and parallel connection of normally-open contacts wherein the paralleled contacts do not connect to the left power line of the ladder diagram.
Figure 7:
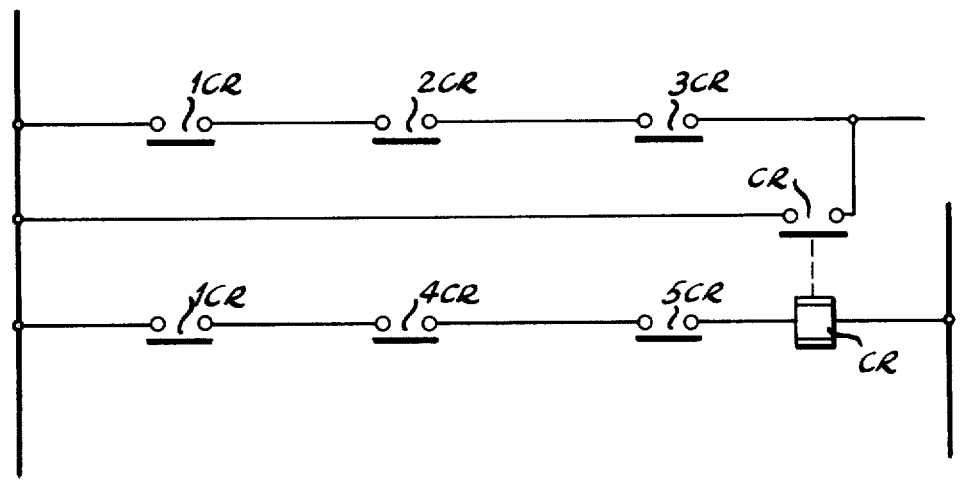
FIG. 7 is a diagram showing how the diagram of FIG. 6 must be modified to obtain a condition wherein all paralleled contacts are connected to the left power line.
Figure 8A:
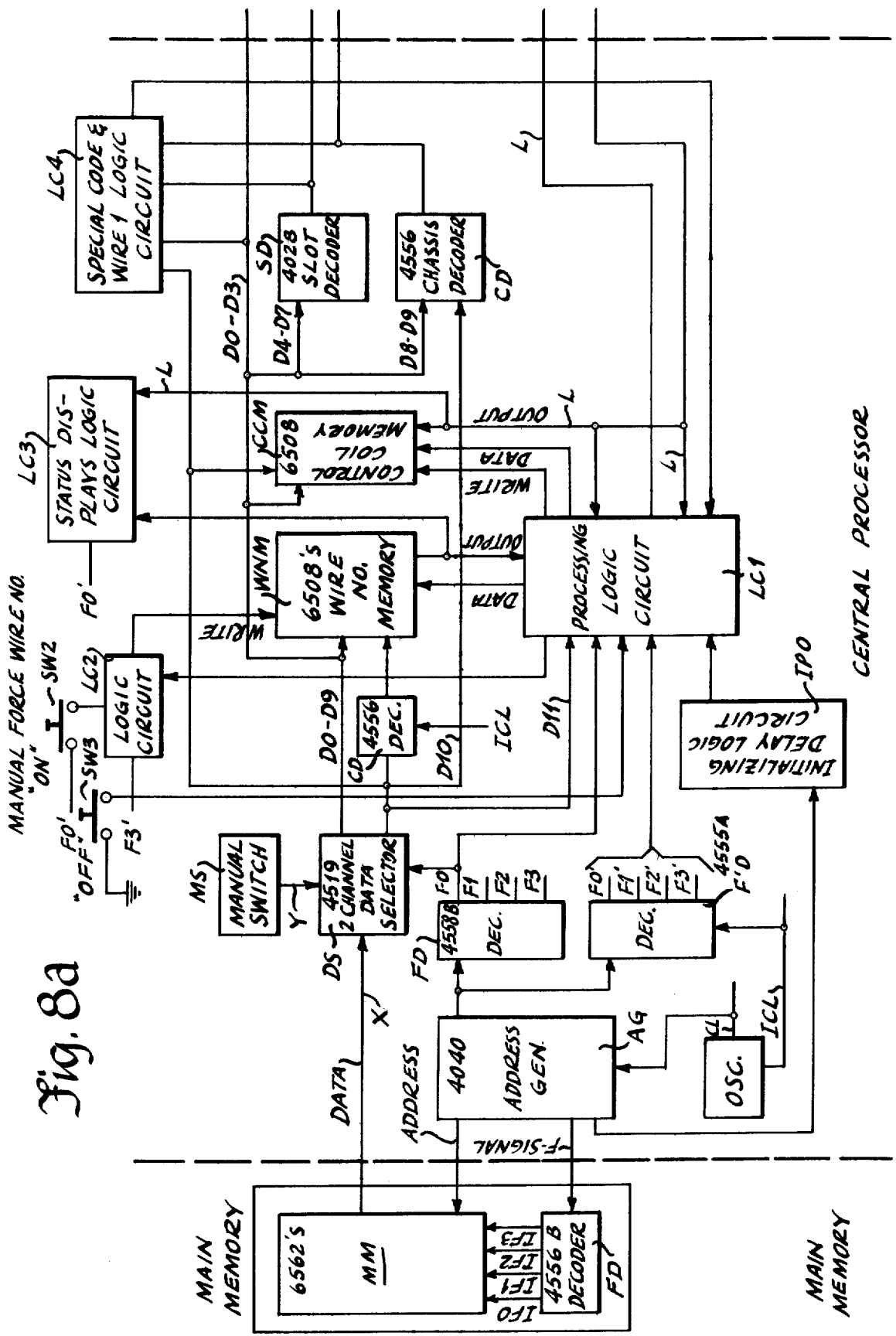

This description will begin with a general description of the block diagram of FIGS. 8a–b and will continue with a detailed description of the detailed diagram of FIGS. 9a–g.

Referring to FIGS. 8a–b, there is shown a programmable controller in block diagram form constructed in accordance with the invention. This controller comprises three generally distinct parts, namely, a main memory section, a central processor section, and an input-output (I/O) section.

The main memory section shown at the left-hand portion of FIG. 8a comprises a "low" field decoder LFD and a memory module MM or plug-in type printed circuit (PC) board having a memory array of the required word capacity mounted thereon. The function of this memory module is to receive, store and make available to the central processor the series of instruction words constituting the program for the controller. For this purpose, this memory module may be of the RAM (random access memory), ROM (read only memory) or the PROM (programmable read only memory) type, or any other type suitable for the purpose. While a single memory module is shown for illustrative purposes, it will be apparent that more than one memory module may be used if needed for a larger word capacity. Also, a single board may have a memory chip array of one of several different word capacities depending upon the desired application of the controller.

The I/O section shown in FIG. 8b comprises input modules or PC boards, output modules or PC boards, and combination input-output modules or PC boards of the latching coil type or the like. Other types such as timers, steppers, sequencers or the like may also be used therein. The input boards receive external input signals from input devices such as pushbuttons, limit switches, transducers, or the like, and transform them to logic levels. They then may be transmitted to the central processor. The output boards receive internal output signals from the central processor and transform them to power levels for transmittal to output or load devices such as solenoids, contactors, indicator lamps, or the like to control the same. The combination I/O boards receive internal logic signals from the central processor in response to which they perform certain functions such as latching, or the like, and then transmit logic signals back to the central processor to link such functions to control "contacts" therein. While only one input board IB, one output board OB, and one latching coil board LCB have been shown in FIG. 8b, it will be understood that more thereof and other types of boards can be connected to the multiple conductors.

The central processor is the control part of the system. This central processor includes a clock CL in the form of an oscillator OSC for performing the timing functions of the system so that every action occurs in its proper and logical order without interfering with any of the other functions. This central processor also includes an address generator AG for providing scanning or cyclic signals for performing certain functions. One of these functions is to address the main memory so that program instruction words may be read out therefrom. Some of these signals, F-signals, are sent to field decoder LFD in the main memory for providing inverted F-signals IF1, IF2 and IF3 for time-division multiplexing purposes and others of these signals, address signal, are sent directly to the main memory for addressing the same. The multiplex signals IF1, IF2 and IF3 select memory chip groups whereas the address signals address locations in these memory chip groups to read out the instructions or data therefrom. Signal IF0 is an inhibit signal as hereinafter described in connection with FIGS. 9a–g.

This address generator also supplies F-signals to a pair of decoders including a high F-decoder HFD and an inverted clock ICL controlled F'-decoder F'D. As shown in FIG. 8a, the F-decoder HFD gates a 2-channel data selector DS to connect a manual selector switch MS therethrough during the F0 time period or to connect the output data channel X from the main memory therethrough during the F1, F2 and F3 time periods. These periods are time division multiplex periods or fields as shown graphically in FIG. 13 during which instruction words read from the main memory or received from the manual selector switch are processed. Inverted clock ICL controlled F'-decoder F'D provides timing signals for controlling the processing logic circuits as hereinafter more fully described in connection with the detailed logic diagram shown in FIGS. 9a-g.

The central processor also includes an initializing delay or initial power on logic circuit IPO. The purpose of this logic circuit is to hold the processor logic elements and circuits in their reset or "0" output condition when power is first turned on or if there is a significant dip in power. Then, when power is fully on, rather than allowing the processor to start on a random time basis, this initial power on logic circuit will allow the processor to be clocked so that it will start at the beginning of a scan at main memory address zero rather than commencing at a random place in a scanning cycle.

The central processor also includes a wire number memory WNM shown in FIG. 8a. This wire number memory is the significant portion of the processor architecture that provides the programming basis termed wire number programming. The ladder diagram shown in FIG. 1 is given wire numbers as with relay control, such as wire numbers 1, 2, 3 and 5. Each wire number defines an interconnected portion of the circuit, these interconnected points being termed "nodes" in circuit theory. The instructions written by the programmer define the logic connected to each wire number. The processor then determines the status of each wire number and maintains a complete record thereof in the wire number memory incorporated for this purpose. That is, the processor stores in the wire number memory the status of each wire number and updates this status if there is any change in it each time that the program is repeatedly run, that is, on each scan. As will be seen, this makes possible a particularly simple programming method for, in effect, the result of every logic operation is now stored away and the programmer no longer has to pick and choose as well as to keep track of what has been stored. The maintaining of wire number status also affords a powerful maintenance tool in that signal tracing is now just a matter of calling up wire number values from the wire number memory. The wire number memory is addressed by the data received through the 2-channel data selector from the main memory. A portion of this data is transmitted to a "low" chip-decoder CD that decodes the same under inverted clock ICL control for selection of the correct chip in the wire number memory while the remainder of the data addresses the location in the wire number memory. Wire number status is written into the wire number memory under the control of logic circuits LC1 and LC2 and signal F3'. The apparatus for reading and writing the wire number status will be described in more detail in connection with FIGS. 9a-g.

The central processor also includes a control coil memory CCM shown in FIG. 8a. The control coils are relay coils such as coil 400 in FIG. 1 exclusive of any coils such as latching coils or the like that are in the I/O section of the controller. The control coil memory is addressed by the data received through the 2-channel (X,Y) data selector DS from the main memory. This is done whenever a contact of the control relay shown in the ladder diagram is being processed thereby to ascertain the status of the contact. That is, if the control coil status read from the control coil memory over bus L is indicative of an energized control coil and the contact being processed is a normally-open contact, the logic circuits will perform a function indicating that such contact is closed so that the logic signal will flow from left to right through such contact. On the other hand, if the control coil status read from the control coil memory is indicative of a deenergized control coil and the contact being processed is a normally-closed contact, the logic circuits will perform a function indicating that such contact is closed so that the logic signal will flow from left to right through such contact. Similarly, an energized coil and a normally-closed contact indication and a deenergized coil and a normally-open contact indication will prevent such logic signal flow. A normally-open (N.O.) contact and a normally-closed contact (N.C.) are indicated by a data bit read from the main memory, the NC contact being an inversion or NOT function relative to the NO contact on data bus D11. When a control coil is energized or deenergized as a result of an output signal, the new status of such control coil is written into the control coil memory by the logic circuits. The apparatus for reading or writing the control coil status from or into the control coil memory will be described in more detail in connection with FIGS. 9a-g.

The central processor is also provided with a slot decoder SD and a chassis decoder CD shown in FIG. 8a for transforming the data received through the 2-channel (X, Y) data selector from the main memory to put it in suitable form for output from the central processor and for addressing the input and output devices in the I/O section of the system. As indicated in FIG. 8a the first four data bits D0-D3 are used on a binary-coded decimal BCD-1, 2, 4, 8 basis to address one of ten elements on a selected I/O printed circuit (PC) board. The next four data bits D4-D7 are changed in slot decoder SD from BCD to decimal 0-9 to address one of ten slots in a selected chassis of I/O PC boards and, consequently, the PC board in the selected slot. The next two data bits D8-D9 are changed in chassis decoder CD from binary to one-of-four 0-3 to address one of four chassis. And the next data bit D10 is used to distinguish I/O addressing from control coil memory addressing.

The central processor is also provided with means to monitor a selected wire number status or a selected control coil or input status. For this purpose, the address of a desired wire number is set on manual switches MS. During the FO time period, the address on the manual switches is substituted for the data from the main memory and is transmitted to the wire number memory, the control coil memory, and to the inputs and coil elements in the I/O section of the system. The status of the addressed wire number is applied from the output of the wire number memory to status displays logic circuit LC3. The latter is gated by the FO' signal to display the status of the wire number on suitable indicators. The input signal on bus L which holds the status of the output of the control coil memory or the status of an input or coil in the I/O section is applied to status displays logic circuit LC3 which is gated by the FO' signal to display the status of the selected control coil or selected input or coil in the I/O section.

The central processor is also provided with means for forcing any wire number to "on" or "off" state. This means is useful to observe the performance of an output device or to set up latching relays or to drop out a sealed circuit, or the like. For example, if the operator desires to check the operation of an output device, he can force the corresponding output wire number to "on" state and then observe whether the output device operates properly. Also, in the event of a machine stoppage due to power interruption or some other cause, the operator can use this means to conveniently set up the latching relays in their correct states to pick up the sequence of operation from the point of interruption. Or the operator can drop out a maintained circuit.

For this purpose, the desired wire number is set up on manual switches MS whereby the selected wire number will be addressed in the wire number memory during the FO time period. At the same time, processing logic circuit LC1 applies a data signal "1" or "0" to the wire number memory under the control of switch SW3 for the FO time period. Now when manual force wire number pushbutton switch SW2 is pressed closed, a write signal is applied through logic circuit LC2 during the FO' time period to force the wire number "on" or "off", followed by the consequent results hereinabove described.

The central processor is also provided with a special code and wire-1 logic circuit LC4 shown in FIG. 8a. The wire-1 logic circuit provides a condition indicative that the left-hand power conductor, that is, wire-1 in the ladder diagram of FIG. 1, is always "on" or energized. This enables the program to get started without a special instruction for this purpose. For this purpose, logic circuit LC4 provides a signal for wire-1 that is substituted for the output from the wire number memory to indicate the "on" condition to logic circuit LC1.

The aforesaid special code logic circuit LC4 is used to define an output instruction. This is done by a special code in the F2 time period. This special code provided by this logic circuit is other than a decimal code. When the processing logic circuit senses this special code, an output action will take place rather than writing the status into the wire number memory.

The aforesaid special code logic circuit LC4 is also used to control an OR logic function where the outputs of several contacts go to the same wire number. The instructions for such contacts are processed as a group but all except the last are partial instructions. The processor will OR together the results of the partial instructions, finally combining with the final instruction for outputting to the wire number memory. This OR action is obtained by using the special code from logic circuit LC4 to inhibit resetting a flip-flop on each partial instruction until the final instruction. The result is that any parallel OR contact can develop an output on a partial instruction as well as on the final instruction and will remain until after the final instruction of the last parallel contact has been processed.

These functions will be described in more detail hereinafter by reference to the specific logic elements in connection with the detailed diagram shown in FIGS. 9a–g.

DETAILED DESCRIPTION

Referring to FIGS. 9a–g, there is shown a detailed logic diagram of the programmable controller that was shown in block diagram form in FIGS. 8a–b. The various logic elements will be identified and their functional characteristics will be described in connection with the description of operation of this detailed diagram.

To consider the operation of this controller, let it first be assumed that power is initially connected thereto. This means that a D.C. voltage of proper magnitude is applied to the various points marked +V, +V1 and +V2. As shown by curve 12(a); meaning curve (a) in FIG. 12, when the power is first turned on at time T1, its value is initially low from which it rises to almost its full value at time T2. When this power voltage +V is initially low, power level detector PLD at the lower portion of FIG. 9b responds thereto to apply a positive voltage from terminal S to reset terminal 4040-11 of 12-stage binary counter 4040; terminal 4040-11 meaning terminal 11 of integrated circuit (IC) 4040 this 4040 being the conventional identifying number therefor used in integrated circuit handbooks. This convention will be used throughout the description of FIGS. 9a–g. This positive voltage, meaning logic high or "1" as compared to logic low or "0", on reset terminal 4040-11 resets all the 12 outputs of this counter to "0" state and holds them at "0" state until the applied power has risen almost to its full value. Since a CMOS memory such as is used herein for the main memory cannot be cycled while the power level is changing below about 95 percent of rated value, that is why the counter is held at reset until the power level has risen to near full value.

Figure 9B:
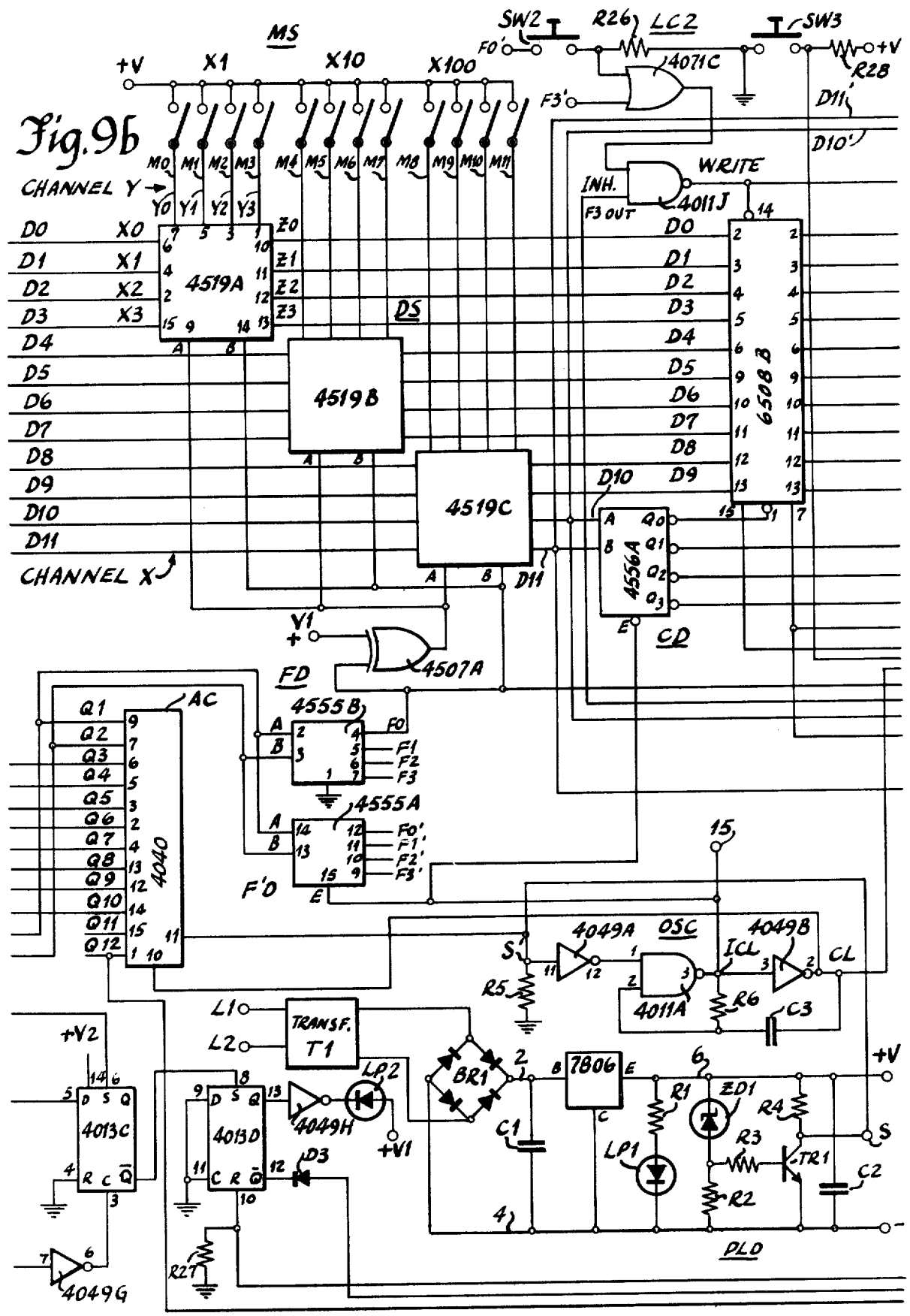

This power level detector as well as the power supply circuit are shown in detail in FIG. 9b. A.C. power is connected to power supply lines L1 and L2 and then through a transformer T1 and a full-wave rectifier bridge BR1 to conductors 2 and 4. A filter capacitor C1 is connected across conductors 2 and 4. The B and C input terminals of an integrated circuit fixed-voltage regulator 7806 are connected across conductors 2 and 4 while the 6-volt D.C. output terminal E thereof is connected to conductor 6 and common terminal C thereof is connected to conductor 4. An indicator circuit consisting of a resistor R1 and lamp LP1 such as an LED (light emitting diode) or the like are connected in series across conductors 6 and 4 to indicate when the power is on. The aforesaid power level detector circuit PLD comprises a zener diode ZD1 and a resistor R2 connected in series across conductors 6 and 4 with the junction therebetween connected through a resistor R3 to the base of a transistor TR1. The collector of this transistor is connected to terminal S and also through a resistor R4 to conductor 6 while its emitter is connected to conductor 4. A filter capacitor C2 is connected across conductors 6 and 4. Conductors 6 and 4 are connected to positive and negative (common or ground) D.C. supply terminals +V and (−), respectively, while terminal S is connected to the oscillator OSC terminal S'.

When A.C. power is connected to lines L1 and L2 as shown by curve 12(a) at time T1, the DC voltage begins to rise on conductor 6 toward its 6-volt final value. Initially, transistor TR1 is non-conducting since zener diode ZD1 having a value of 4.7 breakover voltage blocks current flow through resistor R3 to the transistor base as the voltage on conductor 6 rises. Consequently, the positive voltage on conductor 6 is applied through resistor R4 and terminal S to terminal S' at the oscillator OSC.

As aforementioned, this positive voltage is applied from terminal S' to reset terminal 4040-11 to hold the binary counter reset to zero for the initializing period. This blocks addressing of the CMOS memory MM while power is rising or falling.

This power level detector PLD also holds oscillator OSC inoperative for the initializing period by applying the positive voltage to inverter terminal 4049A-11, which is connected through resistor R5 to ground. This positive voltage causes a low output from this inverter to be applied to NAND terminal 4011A-1 which in turn causes a high output from NAND terminal 4011A-3. This high output is applied through resistor R6 to NAND input terminal 4011A-2 and to inverter input terminal 4049B-3 and a resultant low is applied from inverter output 4049B-2 to capacitor C3 to maintain the oscillator inoperative from time T1 to time T2 as shown by curve 12(h).

At time T2, the power voltage +V on conductor 6 has risen above 4.7 volts, the breakover voltage of zener diode ZD1, as shown by curve 12(a). As a result, current flows from conductor 6 through zener diode ZD1 and resistor R3 to the base of transistor Q2 to turn it on. This causes the voltage at terminal S to be dropped very near ground potential, in effect, a logic "low", thus removing the "high" from reset terminal 4040-11 of the binary counter and from terminal 4049A-11 of the inverter to allow the oscillator to start running as shown by curve 12(h) at time T2. This is the end of the reset period and the start of the initializing period as indicated at the top of FIG. 12. As a result, the oscillator applies clock pulses from inverter terminal 4049B-2 to input terminal 4040-10 of the binary counter to start the latter counting and thus generating memory addresses as hereinafter described. Like integrated circuits such as the 4049 type inverters in the oscillator are referenced 4049A, 4049B, etc., 4049 being its handbook identification number.

The clock pulses shown in FIG. 12(h) are exaggerated for illustrative purposes. The address generator is a 12-bit binary counter whereby it takes 4096 clock pulses input to this counter to operate the counter through one address scan, that is, from zero count through the counter capacity back to zero count. Thus, in FIG. 12(f), the address counter Q12 (twelfth binary bit) pulse goes to "1" at a count of 2048 half-way through the address scan and to "0" at a count of 4096 at the end of the address scan. Thus, it is apparent from comparing curves (f) and (h) in FIG. 12 that there are many more clock pulses for each address counter Q12 pulse. However, that will serve to illustrate the function of the invention. What is important and will be used is the "1" to "0" transition of the counter output bit Q12 to set the initializing flip-flop as hereinafter described rather than allowing random setting thereof during a scan.

Figure 9C:
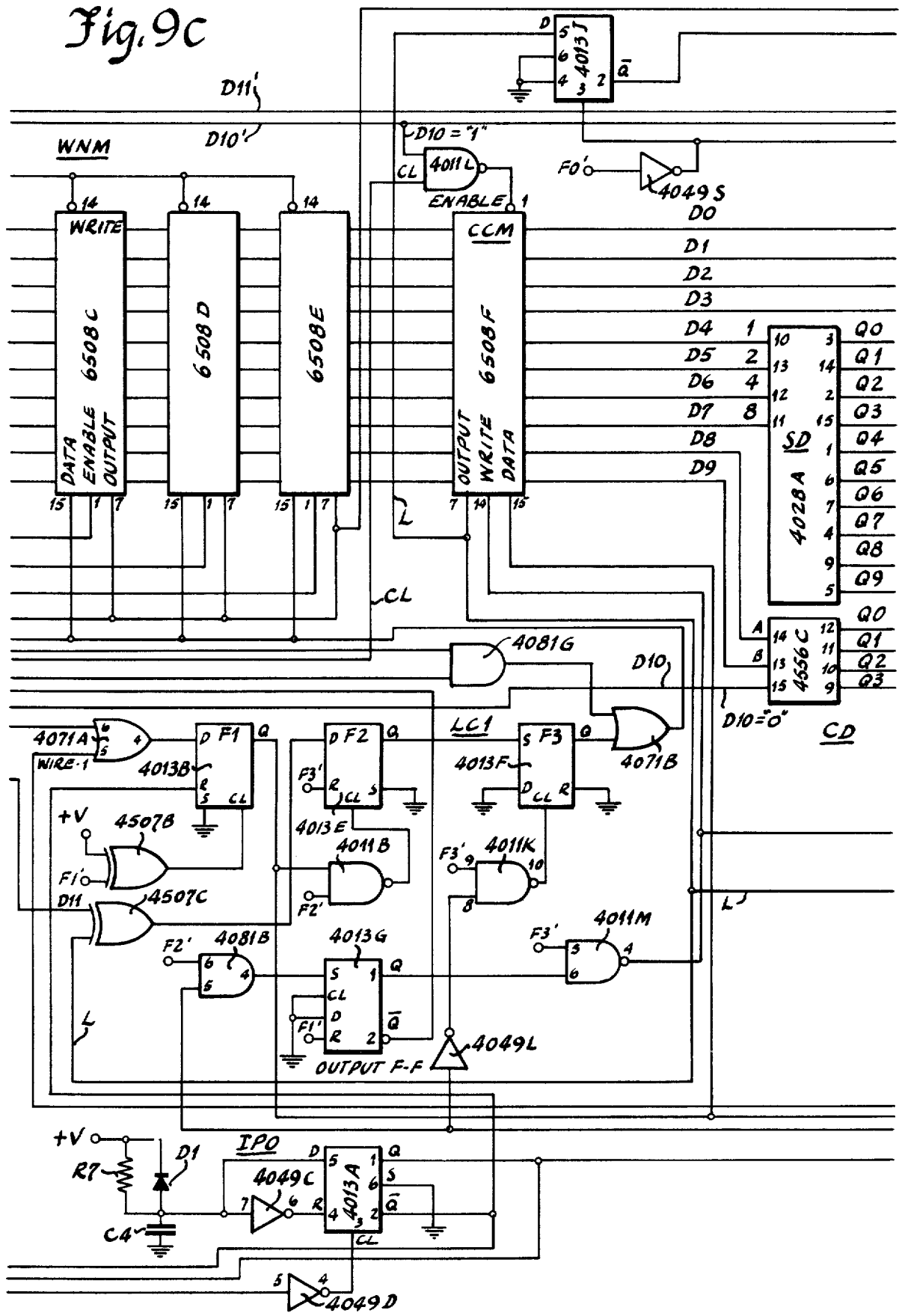

The initializing period indicated at the top of FIG. 12 is controlled by the initializing delay logic IPO shown at the lower portion of FIG. 9c. When power is first turned on as aforementioned, or if there is a significant dip in power level, the action in this integrated circuit controller must be similar to the action in relay control, that is, sealed-in relays must drop out, etc. The equivalent action is produced by the initializing delay circuit at the lower portion of FIG. 9c. Initially, before power is turned on as aforementioned, capacitor C4 is discharged. Upon application of power, the capacitor C4 voltage will still be low with the result that this low is applied to inverter input 4049C-7, effecting a high from inverter output 4049C-6 that is applied as a reset signal to initializing flip-flop 4013A reset R terminal 4013A-4 to reset this flip-flop. As a result, a high is applied from the Q output R to the reset terminal 4013B-4 of the F1 flip-flop 4013B to reset the latter. The result is that the F1 field will be held at "0" and all processor actions will result in "0" F3 outputs both as to wire numbers and output devices.

As hereinbefore alluded to, initializing flip-flop 4013A will be clocked back to its set condition. For this purpose, capacitor C4 will charge by current flow through resistor R7 as shown by curve (b) in FIG. 12. As shown therein, this capacitor C4 charging delay is longer than the reset time T1-T2 and extends near time T3. After this delay when capacitor C4 has charged enough, the inverted reset signal will have decreased and been removed from initializing flip-flop 4013A and at the same time a data "1" will be applied to data terminal 4013A-5 of the initializing flip-flop and the latter will be clocked back on or to its set state by the address counter. This data "1" high will be applied directly from capacitor C4 to data terminal 4013A-5. During this time, the oscillator is running and the address counter is counting. When the address counter reaches its full count completing its present scan and all output bits are reset to "0" including bit Q12, a clock pulse is taken from Q12 output terminal 4040-1 and applied to inverter input 4049D-5 whereby a positive-going pulse is applied from inverter output 4049D-4 to clock terminal 4013A-3 to clock the initializing flip-flop back to its set state. This removes the reset from the F1 flip-flop and insures that normal processor action starts at the beginning of the next scan (memory address zero) rather than commencing at a random place in the scanning cycle.

Diode D1 in the initializing control circuit in FIG. 9c allows a fast discharge of capacitor C4 if there is a significant dip in the power supply voltage level thereby affording reset and initializing actions similar to those hereinbefore described. This is done because otherwise such dips in power voltage might result in erroneous operation.

Program Storage

Before describing the operation of the controller, it will first be explained how the ladder diagram configuration is arranged in the main memory. FIG 1 shows a simple ladder diagram that will serve for illustrative purposes. As shown therein, the left vertical is numbered "1" and the wire nodes toward the right along the "rungs" starting from the top run are numbered "2", "3", etc. as is common practice in relay ladder diagrams. The controller to be described has a capacity for processing 1,000 wire numbers numbered from zero to 999 or over an address range of 0–999.

In this ladder diagram, the pushbuttons and lamp are input and output elements in the I/O section of the controller. The pushbuttons are numbered 003 and 004 in FIG. 9e and the lamp is numbered 020 in FIG. 9f. This controller has a capacity such that up to 400 such elements can be addressed in the I/O section over an address range of 000–399. This address range may overlap the wire number address range because they are in different multiplexed time slots so that there will be no interference as will become apparent.

The address range from 400–799 is used to address control coils in the control coil memory. As shown in FIG. 1, the control coil is numbered 400 and each of its two contacts is also numbered 400. The control coil memory is actually the equivalent of an input-output device but having a capacity of the equivalent of 400 control coils. It is located in the processor for convenience as shown in FIG. 8a and 9c. One bit, D11, in the control coil addressing word defines a N.O. or N.C. contact. If the contact is N.O., D11 is "0" and if the contact is N.C., D11 is "1". As will be apparent, this amounts to nothing more than inverting the signal from the sensed control coil element if D11 is "1", that is, if the contact is N.C.

The ladder diagram configuration shown in FIG. 1 is programmed into the main memory as shown in FIG. 10. The left column shows the successive memory locations numbered in sequence from 000 to 005 and up to 255 if needed. FIG. 9a shows nine HM-6562 memory chips of the 256 X 4 CMOX RAM type with three columns F1, F2 and F3 having three chips, 6562A-C, 6562D-F, and 6562G-I in the respective columns. These columns of memory chips are identified as F1, F2 and F3 to relate them to similarly identified multiplexed time slots or fields hereinafter for convenience. Each chip has four bits output and 256 locations so that the three chips in parallel in each column provide 12-bit words. With the main memory having three columns of chips with three in each column, there is provided memory capacity of three 12-bit words for each memory location. That is, column F1 has a 12-bit word in location 000, column R2 has a 12-bit word in location 000, and column F3 has a 12-bit word in location 000. With this memory arrangement, the input wire number 001 shown in the second column of FIG. 10 is stored in column F1, location 000 of the memory. The contact number 003 shown in the third column of FIG. 10 is stored in column F2, location 000 of the memory along with one "0" bit Q11 indicative of the N.O character of the contact. And the special code SC shown in the last column of FIG. 10 is stored in column F3, location 000 of the memory. From this arrangement, it will be seen that the main memory can be addressed by multiplexing the same location in the three memory chip columns in sequence.

This method of programming a ladder diagram shown in FIGS. 1 and 10 is called wire number programming. Each wire number defines an interconnected portion, or node, of the circuit. The instructions written by the programmer as illustrated in FIG. 10 define the logic connected to each wire number. Wire number programming requires only two instructions: (1) the contact instruction (having three parts) and (2) the output instruction.

Contact Instruction

The contact instruction is written for each contact and consists of the aforesaid three parts shown in FIGS. 1, 10 and 11 including: (F1) the number of the input wire at the left of the contact, (F2) the contact reference number, and (F3) the output wire number at the right of the contact. As aforementioned, the contact reference number further has a Q11 bit flagging the contact as normally-open or normally-closed. As indicated above, the three sections of this instruction are termed F1, F2 and F3, respectively, to relate them to the data word fields or periods and the respective columns of memory chips in FIG. 9a. In the contact instruction, the logic is taken as flowing from the left to the right only, that is, unidirectional logic.

Processing starts with wire number 001 which is assumed to be permanently "on" by having its logic wired in as hereinafter described. This enables the program to get started without a special instruction. The instructions for series contacts are processed in succession. For each, the status of the input wire is retrieved from the wire number memory unless it is wire-1. If the input wire is "on" and the contact is closed, the output wire is set "on" and stored as such in the wire number memory.

In the case where contacts are connected in parallel, the instructions are stored in the memory in succession as a group except all but the last one are stored in the memory as "partial", and the last one is stored as "final". For the "partial" instructions, a special code, SC in FIG. 10, is substituted for the output wire number code. The processor detects this special code when going through the instructions and treats this and any following instructions also having such special code as connected to the same wire. Logically, the results from these instructions are OR'd until the final instruction is detected whereupon the result of the OR operations, including the final operation, is stored in the wire number memory. FIG. 10 shows contact instructions in memory locations 000, 001, 002 and 004.

Output Instruction

The output instruction has only two parts, F1 and F3. The input wire number connected to an output such as a control coil, latching coil, timing coil, or power output is stored in field F1. The output device reference number is then stored in field F3. A special code (1111) is stored in field F2 to indicate to the processor that an output instruction is present. This special code is the same as the partial instruction special code as hereinafter described except that it is in the F2 field rather than the F3 field. FIG. 10 shows output instructions in memory locations 003 and 005, each having a special code SC in field F2.

The special code SC in both cases is actually 1111 and this is automatically displayed as a blank on the programming panel (not shown) when the memory is being programmed. All 1's is a very convenient special code to use, however, it suffices to sense only the 4 and 8 bits of the 1, 2, 4, 8 BCD code since that is a non-decimal special code and, as such, would not be used for addressing.

Timing Chart, FIG. 13

Before continuing with the description of operation of the FIGS. 9a-g diagram, reference will be made to the timing chart shown in FIG. 13. This timing chart may be regarded as starting at its left side from the point where the initializing graph of FIG. 12 ended at its right side at time T3, that is, the normal period.

As shown in FIG. 13, a continuously running symmetrical oscillator, OSC in FIG. 9b, generates a clock signal CL, curve (a) in FIG. 13, that goes negatively for the first half of each F period and positively for the second half thereof. The F periods are F0, F1, F2 and F3 as indicated at the top of FIG. 13 and repeat as shown in FIG. 11 and hereinafter described. This clock signal CL is primarily used for running address generator binary counter 4040 in FIG. 9b.

There is also an inverted clock signal ICL, curve (b) shown in FIG. 13, used for clocking the wire number memory chip-select decoder 4556A and the F' signal decoder 4555A in FIG. 9b and for controlling the parity check in the main memory as hereinafter described.

The next four signals (c), (d), (e) and (f) in FIG. 13 are the F0', F1', F2' and F3' signals provided by F' decoder 4555A in FIG. 9b for performing many of the timing operations in the processor as hereinafter more fully described.

The next signal (g) in FIG. 13 is the FO signal provided by F-period decoder 4555B in FIG. 9b for controlling the data channel switches and the data input to the wire number memory.

The next two signals (h) and (j) are the two least significant bits outputs Q1 and Q2 of binary, address counter AC in FIG. 9b for controlling the field decoder 4556B in the main memory in FIG. 9a.

The next signal (k) in FIG. 13 is the inhibit FO signal IFO for the parity check flip-flop 4013C in FIG. 9c provided by the first output Q0 of the field decoder 4556B in FIG. 9b.

The last three signals (1), (m) and (n) are the word multiplexer signals IF1, IF2, and IF3 provided by the second, third and fourth outputs Q1, Q2 and Q3 of the inverted-F, field decoder 4556B in FIG. 9a.

Main Memory Addressing

The purpose of main memory addressing is to read the program instructions from the memory in sequence and to process them in conjunction with any inputs to provide the resultant outputs to run a machine or the like. The manner of memory addressing is shown in FIG. 11. The oscillator generates the basic timing signal known as the clock CL, curve (a) in FIG. 13, and it is applied to binary counter input terminal 4040-10 in FIG. 9b. As shown in FIG. 13(a), this clock signal goes low for the first half thereof and goes high for the second half thereof. This binary counter is advanced on the leading negative-going edge of the clock pulse as depicted in FIG. 13. Thus, at time T3, the clock pulse goes negative which causes all outputs of the binary counter to be set to zero for the beginning of a new scan. The negative-going edge of the next clock pulse advances the counter to count 1 as shown by curve (h) in FIG 13, that is, this curve goes from "0" to "1". The next clock pulse sets curve (j) to "1" and resets curve (h) to "0" for a binary count of 2. And the next clock pulse sets curve (h) to "1" while leaving curve (j) at "1" for a binary count of 3, etc. These curves (h) and (j) are the two least significant bits (LSB's) Q1 and Q2 of the binary counter output and are used for main memory addressing as hereinafter described.

These two LSB's also define the F0, F1, F2 and F3 time periods.

The counter then continues to advance in binary output manner as shown in FIG. 11 under Address Generator Counter Output. The two least significant bits output terminals Q1 and Q2 are connected to inputs A and B of field decoder 4556B in FIG. 9a in order to multiplex the program instructions from the main memory. This field decoder is a binary to 1-of-4 "low" output field decoder that operates as follows. Zero on both inputs provides low or a zero on output Q0 and a "1" on the other three outputs. A binary "1" input produces a zero on output Q1 and a "1" on the other three outputs. A binary "2" input produces a zero on output Q2 and a "1" on the other three outputs. And a binary "3" input produces a zero on output Q3 and a "1" on the other three outputs. To summarize, as the input to the decoder advances from binary 00 to binary 11, the low output advances from Q0 to Q3. This is shown by curves (k), (l) (m) and (n) in FIG. 13.

The first output Q0 of this field decoder is used as an inhibit signal IF0 and the remaining three outputs Q1 to Q3 are used to multiplex three words from each address of the memory as shown in FIG. 11. This first output Q0 in FIG. 9a is inverted in inverter 4049E which is a 4049 logic device to apply a "1" during the F0 period (See FIG. 13) to direct set terminal 4013C-6 of a Type D flip-flop to place this flip-flop 4013C in its set state wherein its $\overline{Q}$ output is in "0" state. This output is held in "0" state as an inhibit to direct set terminal S of flip-flop 4013D for the F0 period. The remaining three outputs Q1-Q3 of address decoder 4556B are connected to enable terminals 6562-13 of chip columns F1, F2 and F3, respectively, of the main memory. Thus, it will be seen that this address decoder multiplexes like-numbered locations in the three memory chip columns in succession to read the instruction words therefrom.

The next eight bits Q3-Q10 after the two LSB's of the 12-bit binary counter 4040 in FIG. 9b are used to address the main memory locations. The last two bits Q11 and Q12 of this 12-bit binary counter 4040 are not needed for addressing herein but are reserved for use when a double capacity memory having another set of nine chips is used in order to select between the memory sets. As shown in the second row in FIG. 11, bits Q3-Q10 first address the zero memory location in the first chip column or group enabled by multiplex signal 01 to read the F1 word 001. Then the zero locations in the second and third chip columns are enabled by multiplex signals 10 and 11, respectively, to read the F2 and F3 words 003 and 002 in sequence as shown in the third and fourth rows of FIG. 11. The counter then advances to memory location 00000001 as shown in the fifth row in FIG. 11 and the two LSB's reoperate field decoder 4556B to multiplex the three sections of the main memory to read out the F1, F2 and F3 instruction words in sequence. This addressing of the memory continues until the whole program shown in FIG. 10 and at the right-hand column of FIG. 11 has been read. As each word is read from the main memory, it is processed as hereinafter described.

Parity Check

Parity checking is done to determine whether the instruction words that are read from the memory are identical as to the number of "1" bits to the instruction words that were stored therein. Parity means the quality of being equal. For this purpose, the memory is provided with a 12-bit parity tree 4531 and a 1024X1 RAM memory 6508A as shown in FIG. 9a. This parity tree is a 4531 logic circuit known as a parity generator having 12 data inputs D0-D11, an even or odd parity selection input 10, and an output 9. If the signal to parity selection input 10 is "0", the output will be "0" for an even number of data inputs "1" and will be "1" for an odd number of inputs "1". On the other hand, if the signal to parity selection input 10 is "1", the output will be "1" for an even number of data inputs "1" and will be "0" for an odd number of data inputs "1". Thus, it will be seen that a signal "1" on parity selection input 10 in effect inverts the output.

Let it be assumed that when the program was being stored in the memory, as each data code was introduced into the main memory at its input-output terminals D0-D11, each data code was also applied to the 12-bit data inputs of parity circuit 4531 to provide the resultant output. The program can be stored in the memory by addressing the memory locations, enabling the chips by a signal at terminal 13, and applying a write signal to terminal 14. In order to store such data codes in the main memory, it is necessary to address the locations in the main memory. These same address codes were applied to the ten address inputs of parity memory 6508A to address the locations thereof preparatory to storing parity circuit output bits therein. Each time the program data code contained an even number of "1" bits, and with "1" being applied from voltage source +V2 through resistor R8 to parity selection input 10, the resultant "1" output at terminal 9 of parity tree 4531 was stored in the corresponding location of memory 6508A. On the other hand, each time the program data codes contained an odd number of "1" bits, and with "1" being applied from voltage source +V2 to parity selection input 10, the resultant "0" output was stored in the corresponding location of memory 6508A. The data codes that were stored in the main memory in BCD code, that is, four binary bits for each decimal digit, are as follows, accompanied by an indication of whether the number of "1" bits in each code is odd or even. The right-hand column shows the parity bit that was stored in parity memory 6508A for each data code.

| SET | PERIOD | DATA CODES | | | | PARITY BITS |
|-----|--------|------|------|------|------|-------------|
| 1 | F1 | 0000 | 0000 | 0001 | odd | 0 |
|   | F2 | 0000 | 0000 | 0011 | even | 1 |
|   | F3 | 1111 | 1111 | 1111 | even | 1 |
| 2 | F1 | 0000 | 0000 | 0001 | odd | 0 |
|   | F2 | 0100 | 0000 | 0000 | odd | 0 |
|   | F3 | 0000 | 0000 | 0010 | odd | 0 |
| 3 | F1 | 0000 | 0000 | 0010 | odd | 0 |
|   | F2 | 0000 | 0000 | 0100 | odd | 0 |
|   | F3 | 0000 | 0000 | 0011 | even | 1 |
| 4 | F1 | 0000 | 0000 | 0011 | even | 1 |
|   | F2 | 1111 | 1111 | 1111 | even | 1 |
|   | F3 | 0100 | 0000 | 0000 | odd | 0 |
| 5 | F1 | 0000 | 0000 | 0001 | odd | 0 |
|   | F2 | 0100 | 0000 | 0000 | odd | 0 |
|   | F3 | 0000 | 0000 | 0101 | even | 1 |
| 6 | F1 | 0000 | 0000 | 0101 | even | 1 |
|   | F2 | 1111 | 1111 | 1111 | even | 1 |
|   | F3 | 0000 | 0010 | 0000 | odd | 0 |

When the memory is subsequently read, the parity bit is also read from memory 6508A and its output is applied to parity selection input 4531-10 (input 10 of circuit 4531) to maintain the parity output at terminal 9 thereof at "1". For this purpose, when the main memory is addressed and the first instruction code shown above is read therefrom, the parity memory 6508A is also addressed by the same address code and the "0" for odd or "1" for even parity bit read and applied to parity selection input 10 of circuit 4531. This is done by applying inverted clock ICL from terminal 15 in FIG. 9b to terminal 15 in FIG. 9a, inverting the positive-going leading edge thereof, time T5 in FIG. 13, in inverter 4049F, and applying it to terminal of memory 6508A to enable it.

At the same time, the instruction code that was read from the main memory is applied to the 12-bit inputs of parity circuit 4531 as shown in FIG. 9a. If the instruction code has an odd number of "1" bits (the first code above has an odd number), and a "0" is read from memory 6508A and applied to parity selection input 10, the parity tree will provide a "1" output from terminal 9 to data terminal D of flip-flop 4013C. Also, if the instruction code has an even number of "1" bits (the second code above has an even number), and a "1" is read from memory 6508A and applied to parity selection terminal 10, the parity tree will provide a "1" output from terminal 9 to data terminal D of flip-flop 4013C.

Immediately thereafter, at time T6, FIG. 13, an inverted clock pulse ICL is applied from terminal 15 to gate flip-flop 4013C at its clock terminal C. The negative-going part of this inverted clock pulse is inverted to positive-going by inverter 4049G at time T6 to gate the flip-flop. However, this flip-flop 4013C remains in its set state to which it was set by the inhibit during the F0 period if there is no error as hereinbefore described.

In case of error in the instruction reading, the parity circuit will shut down the system so that erroneous directions will not be sent to the output and load. If the read word contains an even number of "1" bits when the correct number is odd, or vice versa, the output of parity tree 4531 will go to "0" whereafter the inverted clock pulse will gate flip-flop 4013 C to its reset state. This causes its $\overline{Q}$ output 2 to go to "1" which is applied to direct set terminal S of flip-flop 4013D to operate the latter to its set state. As a result, the "1" output at Q terminal 13 is inverted to "0" by inverter 4049H to light indicator LP2 as an indication of shutdown. Also, the $\overline{Q}$ output 12 provides a "0" that is applied through diodes D3 and D6 to conductor N in FIG. 9d from where it is applied to several points to shut down the system. These points are in the input circuit in FIG. 9e and the output circuit of FIG. 9f. This shutdown will prevent erroneous operation of the output or machine that is being controlled. It is then necessary to determine the fault and to clear it before reoperating the system.

Program Execution

Having described the parity check, the description of operation will now be resumed in the proper sequence shown in FIG. 13. It will be recalled that at time T3, address counter 4040 in FIG. 9b was advanced to all "0" output state to start a new scan. The legend at the bottom of FIG. 13 indicates this as Advance Counter (CL), Start Scan. The other functions occurring at time T3 and T4 during the F0 period will be described hereinafter in connection with monitoring and forcing of wire numbers "on".

Still referring to FIG. 13, it will be seen that the next clock pulse advances the binary counter to the first count Q1, that is, a high on the LSB output as also shown on the second line in FIG. 11. This causes enabling of the main memory by bits Q1 and Q2 through field decoder 4556B in FIG. 9a and addressing of the main memory by bits Q3 to Q10 thereby to read the data word from the memory onto outputs D0 to D11. This is indicated in FIG. 13 as Read F1 Word at time T5.

At the same time, that is, immediately after time T5, the main memory data channel X(D0-D11) is selected rather than the manual switch (monitor) data channel Y (M0-M11) in order to transmit the instruction word to the processor. This selection is done by operating 2-channel data selectors 4519A, B and C in FIG. 9b. These 2-channel data selectors have a 4-bit capability each, thereby requiring three IC's to switch the 12 bits of the X and Y channels. Each 4-bit selector has two control inputs A and B, two sets of data inputs X0-X3 and Y0-Y3 of four each, and a set of four outputs Z0-Z3. These 2-channel data selectors are identified as 4519 type IC's in handbooks and operate as follows. When a "1" is applied to control input A, the X channel is switched through to the Z outputs. When a "1" is applied to control input B, the Y channel is switched through to the output.

These control input pulses are provided by counter 4040. The two LSB's Q1 and Q2 of this counter are decoded in a binary to 1-of-4 decoder 4555B. Outputs F0, F1, F2 and F3 of this decoder go to "1" in response to binary inputs 00, 01, 10 and 11 and whenever one of the outputs is at "1", the other three are at "0". These F0 to F3 outputs are coincident with the F0, F1, F2 and F3 periods shown in FIG. 13. From this it will be apparent that during the F0 period, the F0 output "1" from decoder 4555B going to control inputs B will gate the Y channel through. Durng this period, the "1" applied to one input of exclusive OR gate 4507A, its other input being permanently connected to "1" at positive voltage terminal +V1, causes a "0" output to be applied to control inputs A. This exclusive OR gate is used as an inverter since it is available in the IC partly used for other purposes.

The alternative X channel switching is done during the F1, F2 and F3 periods. During these periods, an "0", FIG. 13(g), is applied from decoder 4555B output F0 to control inputs B of the 2-channel data selectors. But this "0" applied to one input of exclusive OR gate 4507A causes a "1" output therefrom to control inputs A of the 2-channel data selectors to switch the X channel through. Therefore, during the F1 period, the word read from the main memory is transmitted by the 2-channel data selectors to wire number memory WNM in FIGS. 9b and 9c.

At the same time as the aforementioned decoder 4555B operates, another "high" decoder 4555A is clocked to provide a plurality of timing signals F0', F1', F2' and F3' to control the various processing functions in their proper order. For this purpose, the two LSB's Q1 and Q2 of address counter 4040 are applied to the two inputs of binary to 1-of-4 decoder 4555A and an inverted clock signal ICL, FIG. 13, curves (b), (h) and (j), is applied to enable input E thereof. This inverted clock is "1" for the first half of each period F0, F1, F2 and F3 as shown in FIG. 13(b) and holds the respective output F0', F1', F2' and F3' of decoder 4555A at "0" as shown by curves (c), (d), (e) and (f) in FIG. 13. For the second half of each such period, the inverted clock signal goes to "0" and thus clocks the outputs F0', F1', F2' and F3' to "1" as shown in FIG. 13. These outputs of decoder 4555A are applied to various inputs in the processor in FIGS. 9b and 9c that are identified by like reference characters for timing control purposes as hereinafter described. Period F0 is used for monitoring and periods F1, F2 and F3 are used for processing of the elements of the ladder diagram. This processing during periods, F1, F2 and F3 will be described first, and then the F0 period functions will be described.

The next processing function takes place at time T6 indicated in FIG. 13 as chip-select wire number (WN) memory. This wire number memory WNM is shown in FIGS. 9b and 9c as four 1024X1 memory chips of the 6508 type identified as 6508B, C, D and E. While each such memory chip has only one set of ten I/O terminals 2, 3, 4, 5, 6, 9, 10, 11, 12, 13, two sets are shown for convenience for drawing the lines to connect the address inputs of the four chips in parallel. Thus, terminal 2, for example, on the left side of each chip is the same as terminal 2 on its right side. This wire number memory operates as follows. When an address is applied to the I/O terminals, a chip select enable is applied to terminal 1, data is applied to terminal 15, and a wire signal is applied to terminal 14, the data is stored in the addressed location of the memory. To read data from the memory requires an address at the I/O terminals and a chip select enable signal at terminal 1. As a result, the data bit stored in the memory at the addressed location appears at output terminal 7 of the respective chip.

Decoder 4556A is used to chip select enable the wire number memory WNM. For this purpose, data bits D10 and D11 are applied to inputs A and B of binary to 1-of-4 decoder 4556A and an inverted clock ICL is applied from oscillator OSC to its enable terminal E. This inverted clock ICL goes to "0" at time T6, FIG. 13, and thus enables decoder 4556A to provide a "0" from the output Q0-Q3 selected by the binary input data D10, D11. This "0" is applied to the chip enable terminal 1 of the corresponding wire number memory chip 6508B, C, D or E.

The address D0-D9 along with the chip enable causes the data stored at the addressed location in the wire number memory to appear at output terminal 7. This output is "1" if the wire is "on" and is "0" if the wire is "off". This output is applied to one input of an OR gate 4071A in FIG. 9c to set the F1 flip-flop 4013B if the wire number is "on". The other input to this OR gate is from a circuit defining wire-1 which is the left power conductor in FIG. 1 and which is always taken as "on" as hereinbefore mentioned to enable the program to get started without a special instruction.

Figure 9D:
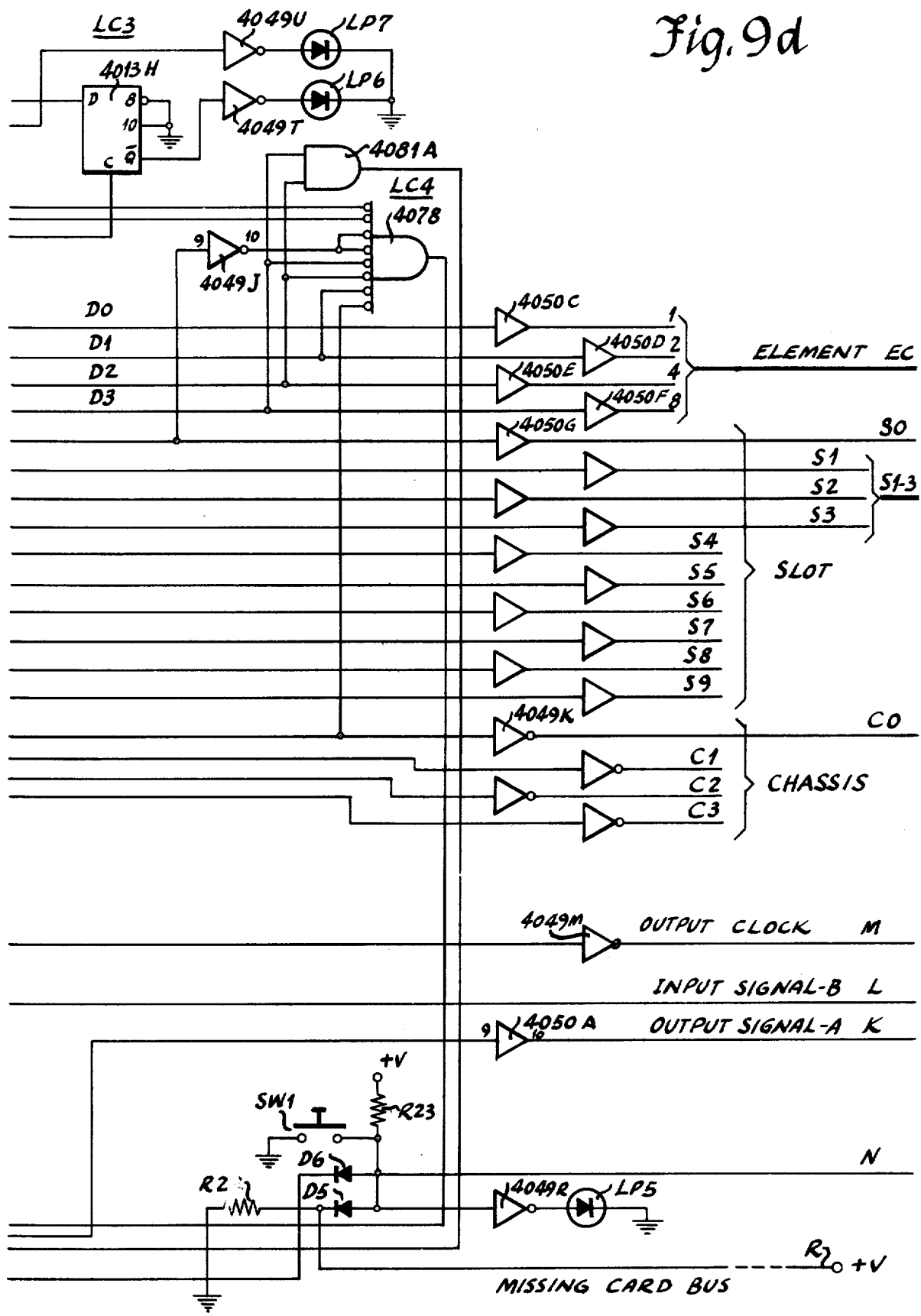

The wire-1 "on" logic circuit LC4 is shown in FIG. 9d. This can be done, since wire number 0 does not exist, by detecting that all address bits except the least significant bit are "0". Even if the LSB is ignored, which means that both wire number 0 and wire number 1 are "wired" as "on", eleven bits have to be sensed. This is reduced by taking advantage of the fact that certain outputs of the address decoders 4556C and 4028A in FIG. 9c generating the chassis select and slot select signals to the I/O section define a condition where the binary and BCD (binary-coded decimal) inputs to these decoders, respectively, are all "0".

For this purpose, there is provided an eight-input NOR gate 4078 used as a NAND gate in FIG. 9d. The first three data bits D1, D2 and D3, after the least significant bit D0, are sensed directly when "0" by gate 4078. The next four bits D4-D7 are determined to be all "0" by sensing the Q0 output line of BCD-to-decimal decoder 4028A because output Q0 is "1" only when all four inputs D4-D7 are "0". This "1" is inverted in inverter logic 4049J to obtain an "0" for two inputs of sensing gate 4078. The next two bits D8 and D9 are determined to be both "0" by sensing the Q0 output line of binary to 1-of-4 decoder 4556C because output Q0 is "0" only when both inputs are "0". And the last two most significant bits (MSB's) D10 and D11 are sensed directly. For this purpose, a pair of conductors D10' and D11' are connected from the output of 2-channel data selector 4519C in FIG. 9b to two inputs of wire-1 sensing gate 4078 in FIG. 9d.

Therefore, when all address bits D1-D11 are "0", a signal "1" will be applied from the output of gate 4078 to the wire-1 input of OR gate 4071A in FIG. 9c. This will cause a "1" to be applied from this OR gate to data input D of F1 storage device such as flip-flop 4013B. This F1 flip-flop will then be clocked at time T7, FIG. 13. For this purpose, the F1' pulse shown as curve (d) in FIG. 13 is applied to one input of exclusive-OR gate 4507B in FIG. 9c that is used as an inverter since it is available on the IC used for other purposes. Since the other input of this exclusive OR gate is permanently connected to positive voltage +V, the negative transition of pulse F1' at time T7 causes a positive transition pulse from the exclusive OR gate, acting as an inverter, to clock terminal CL of the F1 flip-flop to clock the latter to its set state. As a result, a "1" is applied from the Q output of the F1 flip-flop to one input of NAND gate 4011B. This "1" is also applied to data input terminal 15 of control coil memory 6508F, and through a buffer 4050A and conductor K to the I/O circuits for purposes hereinafter described.

This is the end of the F1 period shown in FIG. 13 as time T7 and simultaneously the F2 word is read to start the F2 period. This F2 word is shown in the word list above under Parity Check and is addressed to the main memory by the address shown in the third row in FIG. 11. As will be apparent, whereas the first word was read from the zero location of main memory chips subgroup F1, this word is read from the zero location of chips subgroup F2 shown in FIG. 9a with the aid of the multiplexing of decoder 4556B in FIG. 9a as hereinbefore described.

Figure 9E:
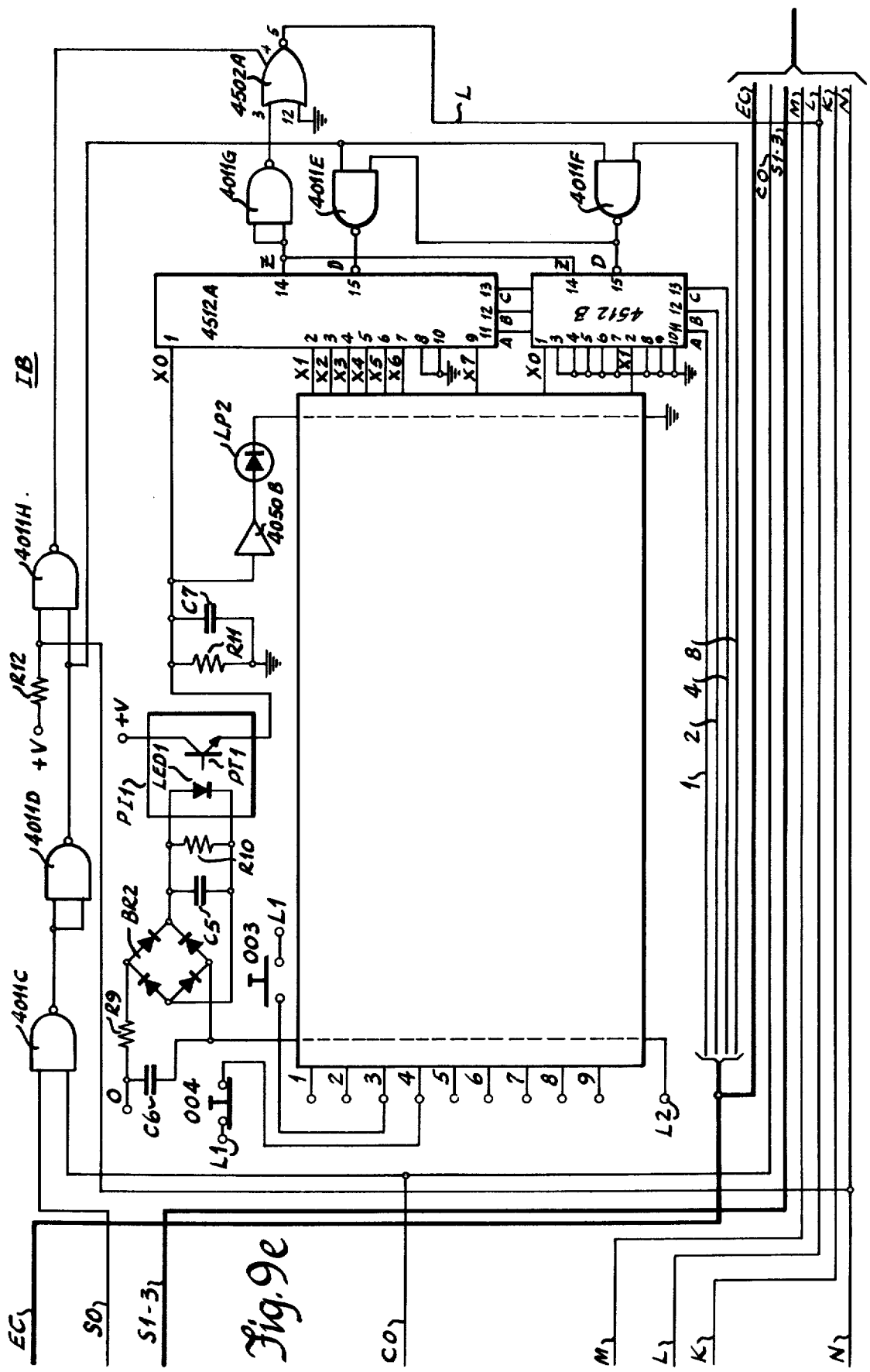

This instruction word 003 shown in FIGS. 1 and 10 defines the normally-open pushbutton contact so that it is necessary to obtain its condition from the input circuit in FIG. 9e. Let it be assumed that this pushbutton contact 003 has been closed. Having this contact number 003, this pushbutton will be connected to input terminal 3 of the input circuit of FIG. 9e as shown therein. Each input terminal 0-9 has a power circuit as shown in connection with input 0 connected thereto, circuits 1-9 being shown as a block to avoid duplication. An A.C. power line L1 is connected through pushbutton contact 003 to input 3, and then through a dropping resistor R9, rectifier bridge BR2, and noise by-pass capacitor C5 and threshold resistor R10 in parallel, to line L2, a noise by-pass capacitor C6 being connected from the input terminal to line L2. Resistor R10 provides a threshold voltage of about 70 volts before current flows in diode LED1. The voltage across resistor R10 is applied to light emitting diode LED1 in a photo-isolator PI1 to render photo-transistor PT1 conducting. A voltage is applied from source +V through this photo-transistor to input X3 of 8-channel data selector 4512A, it being kept in mind that the signal went through the input 3 circuit through it was traced through the input 0 circuit that is shown in detail. This voltage is also applied across a filter including resistor R11 and capacitor C7 in parallel to ground. The voltage thus filtered is applied to the data selector and also through buffer 4050B and lamp LP2 to ground to light the latter so as to indicate that this power circuit input is on.

In order to select one of the ten power input circuits and thus contact 003 and to send back to the processor an indication of its "on" state, the chassis, slot and element codes are applied from FIG. 9d to the logic output section of the input circuit in FIG. 9e. The element select bits D0-D3 are applied directly through respective 4050C-F buffers in FIG. 9d as a BCD code along element cable EC to the input circuit IB in FIG. 9e.

The next four data bits D4-D7 are applied as a BCD code to BCD-to-decimal decoder 4028A to provide ten slot select signals Q0-Q9 in FIG. 9c. These slot select signals are passed through respective 4050 buffers such as 4050G in FIG. 9d. From that point, the 0 slot bus S0 goes to the input circuit IB in FIG. 9e; the 2 slot bus S2 goes to the output circuit OB in FIG. 9f; and the 3 slot bus S3 goes to the latching coil circuit LCB in FIG. 9g.

The next two data bits D8-D9 are applied in FIG. 9c to a binary to 1-of-4 decoder 4556C to provide four chassis select signals. Data bit D10 is sent to chassis select decoder 4556C to enable it only when D10 is "0". This means that the address range 000-399 in BCD code applies to the I/O section of the controller. The last data bit D11 defines the N.O. or N.C. status of the contact controlled by the addressed element. If the contact is normally-open, D11 is "0". If the contact is normally-closed, D11 is "1". Bit D11 is applied to one input of exclusive OR gate 4507C in FIG. 9c. As will be apparent, this amounts to inversion of the signal coming from the input circuit on bus L if D11 is "1", such signal coming to the other input of exclusive OR gate 4507C as hereinafter described.

The input circuit of FIG. 9e is in slot 0 in chassis 0. Therefore, the data word causes an "0" to appear on output Q0 of chassis select decoder 4556C which is inverted to "1" in inverter-buffer 4049K and then applied through chassis 0 select conductor C0 to all three I/O boards in FIGS. 9e, 9f and 9g since all of these circuit boards are in slots in chassis 0. In the input circuit in FIG. 9e, this chassis select signal C0 is applied to one input of NAND gate 4011C while slot select signal Q0 which is "1" in FIG. 9c is applied through a buffer 4050G and slot 0 bus S0 to the other input of NAND gate 4011C in FIG. 9c.

The element select BCD code 0011 comes along bus EC to the logic section of the input circuit to select one of ten power circuits. The 1, 2 and 4 bits 011 of this BCD code are applied to data input terminals 11, 12 and 13 of the 8-channel data selectors 4512A and 4512B while bit 8 code 0 is used to select between the two. This is because each has only eight channels and two of them must be used to accommodate ten element selection.

This 8-channel data selector operators as follows. When the element select BCD code 011 is applied to address terminals A, B, and C, the data "1" on input channel X3 appears at output Z, provided a "0" is present at disable terminal D. For this purpose, it will be recalled that logic "1" slot and chassis select signals were applied to the inputs of NAND gate 4011C in FIG. 9e, to provide a "0" from the output thereof. This is inverted to a "1" in NANd gate 4011D connected as an inverter and applied to one input of NANd gates 4011E and 4011F at the right-hand portion of FIG. 9e. Since bit 8 of the BCD element select code is "0" and is applied to the other input of NAND gate 4011F, the latter will provide a "1" to inhibit selector 4512B at its disable terminal D. This "1" is also applied to the other input of NAND gate 4011E whereby the latter provides a non-disable "0" to disable terminal D of 8-channel data selector 4512A to select this 8-channel data selector unit; all other units float on the line, consequently, the data "1" on input X3 appears at output Z, is inverted to "0" in NAND gate 4011G connected as an inverter, and re-inverted to "1" in inverter-buffer 4502A, and then applied through conductor L, signal-B bus, back to the processor as a signal indicating that external pushbutton contact 003 is closed thereby providing an input signal to the system. For inputs 8 and 9, the element select address code selects 8-channel data selector 4512B and disables 4512A through gates 4011E and 4011F.

NAND gate 4011H at the top of FIG. 9e provides a shut down circuit for the input circuit if a shutdown "0" signal appears on conductor N. Normally, a "1" is applied from source +V through resistor R12 to one input of NAND gate 4011H and a "1" is applied from gate 4011D to its other input so that gate 4011H provides a "0" to disable terminal 4 of inverter-buffer 4502A so that it functions correctly and an "0" on input 3 is inverted to a "1" on output 5 as hereinbefore described. However, if a shutdown signal "0" comes in on conductor N to the upper input of NAND gate 4011H, its output will go to "1" to disable inverter-buffer 4502A.

The requirement for setting of the storage device such as F2 flip-flop 4013E in FIG. 9c, indicative that the contact is closed, is as follows. F2 flip-flop is set to "1" if, and only if, F1 flip-flop has been previously set to "1", indicating that the input wire number to the contact is "on", and the signal from the selected input circuit element is "1", after passing through exclusive-OR gate 4507C.

Now the signal "1", indicative of the closed state of pushbutton contact 003, that was sent back from the input circuit in FIG. 9e on signal-B bus L is applied in FIG. 9c to one input of exclusive-OR logic 4507C. Since contact 003 is a manually-operable input device, data bit D11 going to the other input of exclusive-OR logic 4507C is "0". Consequently, a "1" is applied from gate 4507C to the data input D of F2 flip-flop 4013E. Since the contact that was sensed was on, this F2 flip-flop will be set. In order to do so, the F1 flip-flop must be in set state, and it is, thereby applying a "1" to one input of NAND gate 4011B. Therefore, at time T9, FIG. 13, when the F2' pulse applied to the other input of gate 4011E goes negative, the output of gate 4011B goes positive to clock F2 flip-flop 4013E to its set state. The "1" from output Q of the F2 flip-flop is applied to the direct set terminal S of storage device such as F3 flip-flop 4013F. This setting of the F3 flip-flop is indicative that the output wire number 002 is on. Referring to FIG. 1, it will be seen that since wire-1 is always on and since contact 003 was sensed to be closed, or on, then wire number 002 as a result thereof will be on. It is for this reason that the F3 flip-flop will be direct-set by the F2 flip-flop.

Partial Instruction

This time T9 is the end of the F2 period and the start of the F3 period as shown in FIG. 13. At this point in time, the main memory is addressed as before and as shown in the fourth row in FIG. 11 and the F3 word is read. As hereinbefore mentioned in connection with special code logic LC4 of FIG. 8a, a "partial" contact action is in order here. This is because the pushbutton contact 003 instruction being processed is one of two contacts whose outputs are connected to the same wire number 002, the other parallel contact being 400 as shown in FIG. 1.

In such case, the programmer writes the several contact instructions as a group except that all but the last are entered into the main memory as "partial"; the last is then entered as final. It will be seen from the program listing above under Parity Check, third row, that the F3 instruction for pushbutton contact 003 is a special non-decimal BCD code 1111, that is, all data bits being "1", which is used to perform the OR function of the contacts in parallel. The processor detects this special code when going through the instructions and treats this and following instructions also having the special code as connected to the same wire if there are more than two contacts so connected or in parallel. Logically, the results from these instructions are OR'd until the final contact of the parallel group is processed whereupon the result of the OR operations is stored in the wire number memory as hereinafter more fully described. This special code 1111 is a non-decimal code because, of the BCD code digits 8, 4, 2, 1, the 8 and 4 could not both be "1" for any decimal code 0-9.

The F3 special code having been read, the 2-channel selector switches in FIG. 9b are operated as before to pass the data word to wire number memory WNM. The wire number memory is addressed and enabled by decoder 4556A.

The OR is obtained by blocking the resetting of the F3 flip-flop, normally reset by signal F3', until the final parallel contact action. The result is that the F3 flip-flop can be set to "1" by any one of the partials, as well as the final, and will stay a "1" until after the final parallel contact instruction. That is, once the F3 flip-flop is set on by at least one of the parallel contacts being processed, it remains on until the final contact action, the "on" state of the output wire number is stored in the wire memory, and the F3 flip-flop is then allowed to reset. For this purpose, the D2 and D3 data bits which are "1" by virtue of the special "partial" code are sensed by AND gate 4081A at the top of FIG. 9d which provides a "1" output that is inverted to "0" by inverter 4049L at the bottom of FIG. 9c and applied to one input of NAND gate 4011k to inhibit any positive transition clock pulse therefrom that is required to reset the F3 flip-flop when the time for it comes at time T11 as hereinafter described.

The F3 flip-flop having been placed in its set state at time T9 as hereinbefore described, the F2 flip-flop will be reset at time T10. This is done by applying the positive-going F3', curve 13(f), pulse to the direct-reset terminal R thereof. This causes the Q output of the F2 flip-flop to remove the "1" from direct-set terminal S of the F3 flip-flop. Since data input D of the F3 flip-flop is connected to "0" at ground, it can normally be clocked back to its reset state at time T11 by signal F3' going negative provided the other input of NAND gate 4011K is at "1". However, since such other input 8 has a "0" inhibit from the "partial" code as hereinbefore described, the F3 flip-flop remains in set state as an OR logic action.

The programmable controller then processes the next wire-1 instruction during the F1 period as before followed by the contact 400 instruction during the F2 period. As shown in FIG. 1, this contact is a normally-open contact of coil 400 which at the moment is not energized so that contact 400 is open. The state of this contact will be determined by sensing the state of its control coil as well as the N.O. - N.C. nature of the contact on data bit D11.

The control coils are not located in the I/O section but rather their status is incorporated in a 1024X1 control coil memory CCM chip 6508F in the processor in FIG. 9c. This memory is sensed to determine the status of the corresponding contact controlled by this control coil. For this purpose, the first ten data bits D0-D9 of the F2 word are sent to the control coil memory as an address. Data bit D10 provides a chip select enable signal that is clocked. It will be apparent that since the chip select enable signal requires that D10 be "1", the BCD address range for control coils will be 400-799. Thus, bit D10 is applied through conductor D10' in FIGS. 9b and 9c to one input of NAND gate 4011L and a positive-transition clock pulse CL is applied to the other input of this NAND gate from the oscillator in FIG. 9b. As a result, this NAND gate outputs a negative-transition chip select enable signal to control coil memory 6508F to read the data stored therein that appears at output terminal 7. This data is "0" since the coil is not energized and is applied to one input of exclusive-OR gate 4507C. The data D11 bit to the other input thereof is "0" since the contact is normally-open so that this exclusive-OR gate outputs a "0" and the F2 flip-flop is not set at time T9, FIG. 13.

The F3 action follows next. Since the preceding F2 action was a contact instruction action, this F3 action will be a "final" contact instruction action. This final contact instruction action takes place if it represents a single contact or if the instruction is, as here, the last one of several contact instruction actions all outputting to the same wire number.

The action during this F3 period is to store the "1" from the F3 flip-flop, which has been retained thereby the "partial" code, into the wire number memory as the "on" state of wire number 002.

At the start of the F3 period, the instruction word is read from the main memory as before and used to address the wire number memory at time T9, FIG. 13. Then at time T10, decoder 4556A applies a chip select signal to terminal 1 of the wire number memory. Also at this time, the "on" status of output wire number 002 is written from the F3 flip-flop into the wire number memory. The F3 flip-flop 4013F output "1" is applied from its terminal Q through OR gate 4071B to the data input terminals 15 of all four wire number memory chips 6508B-E in FIGS. 9b and 9c.

The alternative input to OR gate 4071B is signal F0 from decoder 4555B, which means that a "1" is always placed on the data-in lines to the wire number memory during the F0 period, see FIG. 13. This is part of the logic for manually forcing wire numbers to "1" for monitoring as hereinafter described.

The write input to the wire number memory must go negative to write the data into the selected address of the selected memory chip. For this purpose, at time T10 in FIG. 13, the positive-going F3' pulse shown in FIG. 13(f) is applied in FIG. 9b through OR gate 4071C to one input of NAND gate 4011J.

The other input to OR gate 4071C is the manual force signal hereinafter described.

The other input of NAND gate 4011J receives a "1" from the $\overline{Q}$ output 2 of output flip-flop 4013G. The output flip-flop is normally in reset state and is set only for an output instruction. In its reset state, its $\overline{Q}$ output provides the "1" to NAND gate 4011J to gate the write signal to terminals 14 of the wire number memory chips. In its set state, the $\overline{Q}$ output of flip-flop 4013G will provide a "0" to inhibit the wire number memory write signal on an output instruction. As a result, the "1" or "on" status of wire number 002 has been stored in the wire number memory.

Also, at time T10 in FIG. 13, the F2 flip-flop is reset by applying the positive-going F3', curve 13(f), to the direct reset terminal R thereof. This causes the "1" to be removed by the Q output of the F2 flip-flop from direct set terminal S of the F3 flip-flop. Since data input terminal D of the F3 flip-flop is connected to "0" at ground, it can be clocked back to its reset state by the negative transition of the F3' signal at time T11. This is done at time T11 by the F3' signal through NAND gate 4011K in FIG. 9c. A "1" is applied from inverter 4049L to one input of NAND gate 4011K. The input to this inverter is "0" because both of the two most significant bits D2 and D3 of the BCD element select code cannot be "1" for a decimal code. Thus, AND gate 4081A provides a requisite "0" to inverter 4049L to allow resetting of the F3 flip-flop. A "1" being on the lower terminal of NAND gate 4011K when signal F3' goes negative at time T11, the output of this NAND gate 4011K provides a positive-going level change signal to reset the F3 flip-flop.

The parallel contacts have now been processed and the "on" state of wire number 002 stored in the wire number memory.

The processor continues to execute the program and next processes input wire number 002, contact number 004 and output wire number 003 of the normally-closed pushbutton contact. The "1" state of input wire number 002 is read from the wire number memory where it was previously stored. This memory is addressed in the manner hereinbefore described and the "1" status retrieved at output terminal 7 and applied through OR gate 4071A to set the F1 flip-flop. The state of the N.C. contact 004 is then sensed from the input circuit in FIG. 9c. Note that this N.C. contact is connected as element 4 therein and its "on" state is sent by way of conductor L to exclusive-OR gate 4507C to set the F2 flip-flop as hereinbefore described in connection with pushbutton contact 003. Since this contact is "on", the F3 flip-flop will be direct-set so that output wire number 003 will be "on" and thus stored in the wire number memory.

The processor continues to execute the program and processes the fourth set of three-part (F1, F2, F3) instructions shown in the above list under Parity Check. By reference to FIG. 1, it will be seen that this is an output instruction since it involves the status of control coil 400. The output instruction involves a special code in the F2 word. The wire number connected to an "output" such as a control coil, latching coil, timing coil or power output, or the like, is defined by the F1 word. The output device reference number is defined by the F3 word. A special code is defined by the F2 word and this indicates to the controller that an output instruction is in force. This special code is the same non-decimal BCD code 1111 as was used to perform the "partial" OR logic function for several contacts connected to the same output wire except that it is herein used in place of the F2 instruction word rather than the F3 instruction word as therein.

For this set of instructions, first the input wire number "1" status is retrieved from the wire number memory and used to set the F1 flip-flop during the F1 period as before described. Next the special code is sensed by AND gate 4081A in FIG. 9d to apply a "1" to input 5 of AND gate 4081B in FIG. 9c. At time T8, signal F2' is applied to input 6 of AND gate 4081B causing it to direct-set output flip-flop 4013G to "1" whereupon an output action takes place during the F3 period, rather than writing into the wire number memory as previously described.

For this output action during the F3 period, the "on" state of the control coil is written into the control coil memory CCM. First, the F3 instruction word is read from the main memory and used to address the control coil memory. Since data bit D10 is "1" for the control coil reference number 400, as shown in the above program under Parity Check, it is applied from channel switch 4519C in FIG. 9b through conductor D10' to one input of NAND gate 4011L in FIG. 9c whereas its other input is clocked at time T10 to enable the control coil memory as hereinbefore described in connection with processing parallel contact 400.

At the same time, a "1" is applied from the Q output of output flip-flop 4013G in FIG. 9c to NAND gate 4011M and its other input is clocked by signal F3' at time T10 to provide a "0" to write teminal 14 of the control coil memory. This causes the "1" from the F1 flip-flop 4013B output Q being applied to data terminal 15 to be written into the addressed location of the control coil memory. During this time, a "0" is sent from the $\overline{Q}$ output 2 of the output flip-flop to one input of NAND gate 4011J in FIG. 9b to inhibit writing into the wire number memory.

Figure 9F:
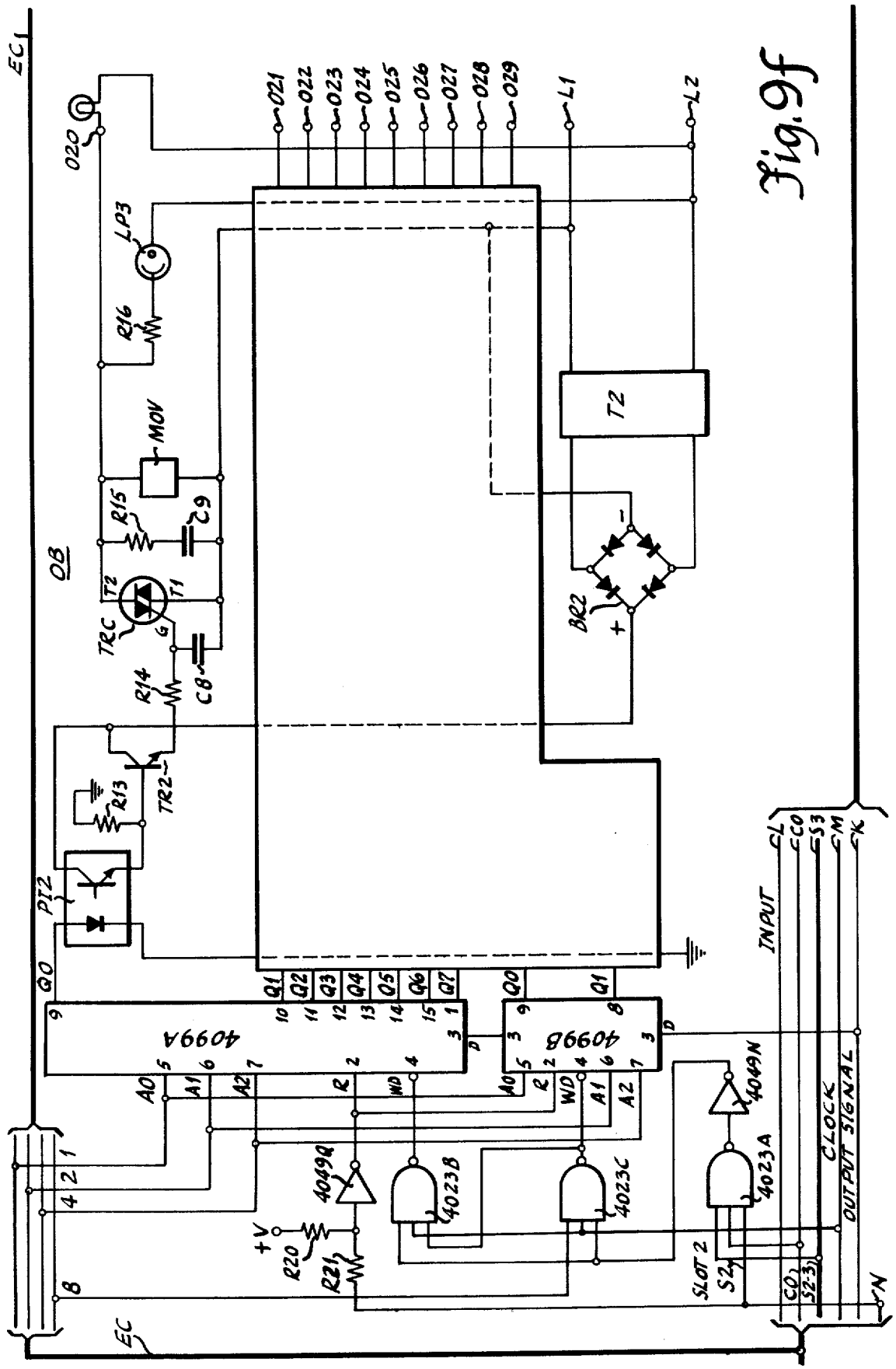
Figure 9G:
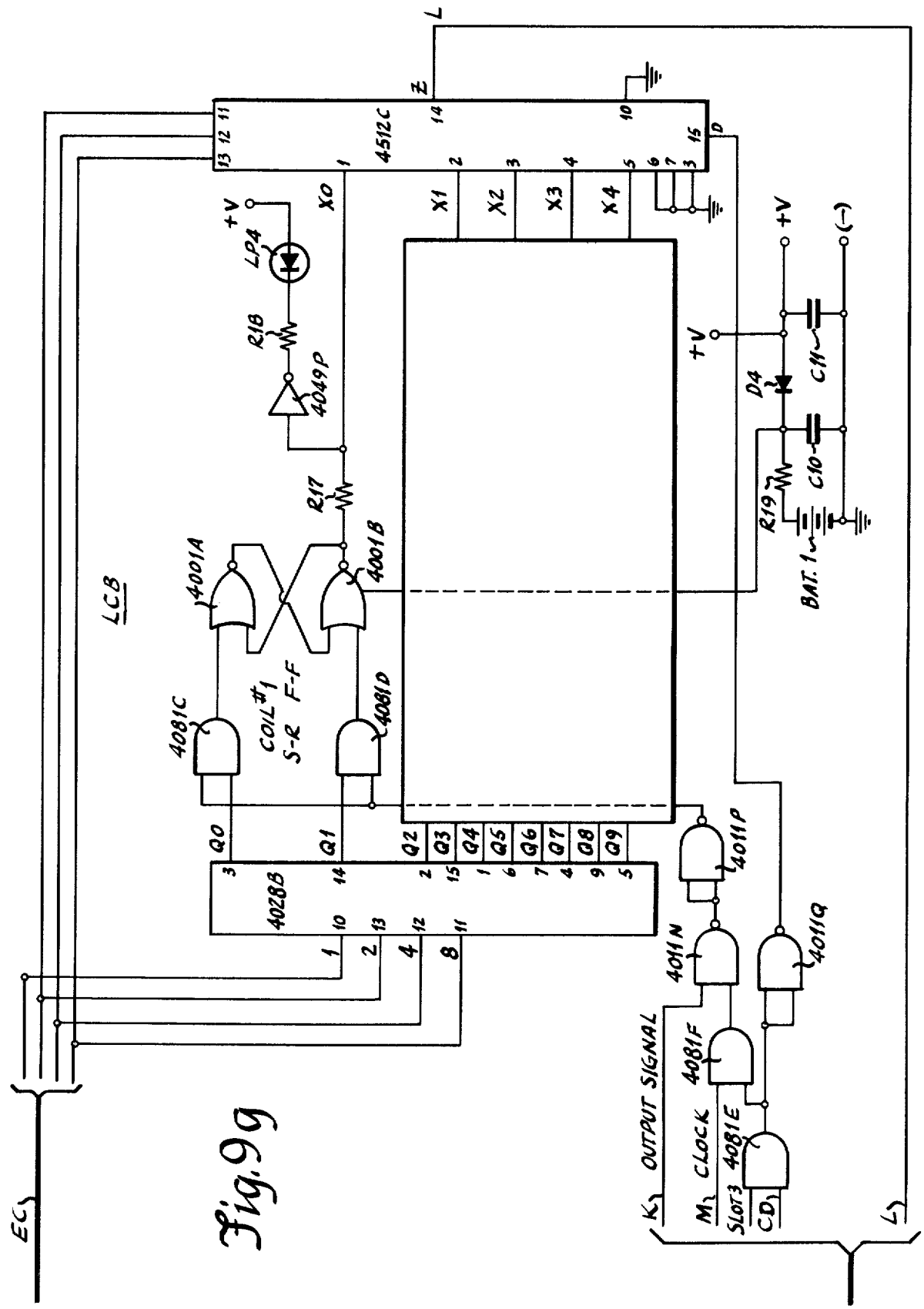

At the same time, the "1" status of the F1 flip-flop is sent out through buffer 4050A and output conductor K to the output circuit in FIG. 9f and the latching coil circuit in FIG. 9g. And at the same time, an output clock is sent from NAND gate 4011M, inverted to "1" by inverter 4049M and sent out on conductor M to the aforementioned output circuits to gate the output signal into their buffers in the event this had been an output directed to one of them rather than the control coil memory.

The completes the processing of the fourth set of instructions shown in the above list under Parity Check.

The fifth set of instructions including input wire-1, contact 400 and output wire number 005, FIG. 1, is processed like the second set of instructions except that when the control coil memory is sensed to determine the state of this contact, it will be "1" rather than "0" because the control coil is now "on". At the end of this processing, the "on" state of wire number 005 will be stored in the correspondingly addressed location in the wire number memory in the same manner hereinbefore described.

The controller will then proceed with processing the final instruction set which is an output instruction that will result in lighting the lamp in the output circuit in FIG. 9f.

For this sixth and last instruction set, the main memory is addressed as before to read the word 005 that is used to address the wire number memory so as to retrieve the "1" state of this input wire number and set the F1 flip-flop.

Next, the special non-decimal code 1111 is detected by AND gate 4081A in FIG. 9d and its output used to set the output flip-flop in FIG. 9c with the aid of the F2' signal at time T8 as hereinbefore described. The output flip-flop applies a "1" to one input of NAND gate 4011M.

Since the output flip-flop has been set during the F2 period, an output action will take place during the F3 period rather than writing into the wire number memory. When the lamp 020 instruction code is read and sent down the data channel, it will not address the wire number memory because the latter is inhibited by the $\overline{Q}$ signal from the output flip-flop terminal 2 as hereinbefore described. It will not address the control coil memory because data bit D10 is "0" which inhibits chip enable of the control coil memory. Consequently, this data word will be passed on for output selection in FIG. 9f. The first four data bits D0-D3 will go over element code bus EC as a four bit BCD element select code to select lamp 020 in FIG. 9f. The next four data bits D4-D7 are decoded to slot select decimal digits Q0-Q9 and a signal is sent over slot 2 bus S2 to the output circuit in FIG. 9f. The next two data bits D8-D9 are decoded to four chassis select bits B0-B3 and a signal is sent over chassis 0 bus C0 to the output circuit in FIG. 9f.

The output circuit of FIG. 9f is on an individual printed circuit board designated output board OB that plugs into a slot in the mounting chassis as are each of the other I/O circuits shown in FIGS. 9e, f and g.

This output circuit has ten elements and amplifiers which can supply power current to such loads as solenoids, lamps, etc. Each load is connected between an output terminal and A.C. power supply line L2. These output terminals are numbered 020, 021 to 029, meaning chassis 0, slot 2, and element 0 in the case of the lamp, in that order. The state of each output is indicated by a neon lamp such as LP3 on the front panel of the PC board.

The output board has ten buffer storage elements which are set through the output instruction. To provide for the ten elements, two 8-bit buffer storage IC's in the form of 4099 type addressable latches 4099A and 4099B are used. This latch operates as follows. Data is inputted to a particular element in the latch when that element is addressed at address inputs A0, A1 and A2, and when write-disable WD is at "0". When write-disable is "1", data entry is inhibited, but all eight outputs can be continuously read independently of write disable and address inputs.

Referring to FIG. 9f, it will be seen that the first three element select BCD bits 1, 2 and 4 are used to address both latches whereas the fourth BCD bit 8 is used to select latch 4099A for elements 0-7 and to select latch 4099B for elements 8 and 9. During the final F3 period, the element select code bits D0–D3 are used to address the latch. At the same time, the chassis O and slot 2 signals CO and S2 are applied to two inputs of NAND gate 4023A. At the same time, since the F1 flip-flop is set, a "1" is applied through conductor K as an output signal to data inputs D of latches 4099A and −B. Then at time T10, signal F3' at NAND gate 4011M in FIG. 9c clocks the set state "1" of the output flip-flop over bus M to first inputs of NAND gates 4023B and −C. The third input of NAND gate 4023A receives a "1" from the positive voltage terminal in FIG. 9d through resistor R23 and conductor N except in the case of parity error shutdown when the signal on conductor N is "0" as hereinbefore described. The resultant "0" output of gate 4023A is inverted in inverter 4049N and applied to second inputs of NAND gates 4023B and 4023C. Since element select BCD bit 8 is "0" for element 0, NAND gate 4023C applies a "1" to the third input of NAND gate 4023B thereby providing the requisite "0" to the write-disable input WD to afford operation of latch 4099A and set the Q0 buffer element therein, resulting in a supply of current to photo-isolator PI2.

As shown in FIG. 9f, in the output circuit the power switch is a triac TRC with a power connection referenced to power line L1. When gated, the triac closes and the output terminal is shorted to line L1 thereby energizing the lamp connected between output 020 and line L2. The input to the triac is provided by a circuit powered from a D.C. supply, consisting of transformer T2 and rectifier bridge BR2, referenced to line L1. The positive D.C. powers the output transistor of photo-isolator PI2 which controls a darlington transistor TR2 connected as an emitter follower and a resistor R13 being connected from the base of the transistor to ground. The emitter output supplies the turn-on current to the triac through a series resistor R14, there being a noise-shunting capacitor C8 across the triac gate G and terminal T1. A snubber circuit, R15-C9 network, limits voltage transients to prevent the triac from turning on from commutation. A MOV transient suppressor limits noise voltages applied to the output terminal. An indicator light LP3 is connected in series with a resistor R16 between line L2 and the output terminal to show the state of the output, and it is on when the output is at line L1 potential. Lamp 020, FIG. 1, is connected between the similarly referenced output in FIG. 9f and line L2.

From the foregoing, it will be apparent that when the program has been executed, wire numbers 2, 3 and 5 will be "on", coil 400 will be "on", both contacts 400 will be closed, and lamp 020 will be lit.

Latching Coils

Although the latching coils circuit of FIG. 9g was not used in the simplified program hereinbefore executed, a brief description will show that it can be addressed by an instruction code in a similar manner and operated to provide a latched coil signal back to the processor for the desired control.

This latching coil PC board LCB has five elements which enables latching relays to be programmed into a ladder diagram. The coils are energized or deenergized through the output instruction; and contacts thereof are linked to the coils through the contact instruction. The five elements are power-off retentive and have front panel state indication by lamps such as LP4. These elements may be set manually through the wire number force feature hereinafter described. Simultaneous latch and unlatch gives an unlatch condition.

As shown in FIG. 9g, the latching coil circuit comprises a BCD-to-decimal decoder 4028B, five set-reset flip-flops of which the first one, coil #1 S-R F-F, is shown in detail and the rest as a block, and an 8-channel data selector 4512C. It also includes some logic elements for processing the input control signals and a power-off retentive battery circuit.

The latching coil circuit has five elements that can be individually latched and unlatched through the output instruction. Two coil numbers are used for each latching coil: an even number for latching and an odd number for unlatching. For example, a coil number XX0 would latch the first coil and a coil number XX1 would unlatch it; number XX2 would latch the second coil and number XX3 would unlatch it, etc.

Each of the five gated set-reset flip-flops is formed from two AND gates 4081C and 4081D and two cross-connected NOR gates 4001A and 4001B. The element select code from the coil number of the output instruction, is applied to BCD-to-decimal decoder 4028A and the output of this decoder, of which only one can be "1" at a time, selects not only one of the set-reset flip-flops but also selects either the set or reset input of that flip-flop. If the element BCD code is 0000, output Q0 applies a "1" on one input of AND gate 4081C and its other input receives a "1" as follows. Chassis 0 and slot 3 signals "1" are applied to AND gate 4081E which applies a "1" to one input of AND gate 4081F. An output clock "1" comes in at time T10, FIG. 13, on conductor M to the other input of AND gate 4081F since the output flip-flop in FIG. 9c is set. AND gate 4081F applies a "1" to one input of NAND gate 4011N and an output signal "1" comes from the set F1 flip-flop through non-inverting buffer 4050A and on conductor K to the other input of NAND gate 4011N. The "0" output of the latter is inverted in NAND gate 4011P and applied to the other input of AND gate 4081C to set the flip-flop. For this purpose, the "1" output from AND gate 4081C provides an "0" output from NOR gate 4001A that is applied to one input of NOR gate 4011B. As a result, the output of the latter goes to "1" that is applied through resistor R17 as a latching relay set signal to input X0 of 8-channel data selector 4512C.

In order to reset this latching coil element, it is only necessary to program an element select BCD code 0001 so as to provide a "1" at output Q1 of decoder 4028B.

The aforesaid set signal is also applied to inverter 4049P so that the "0" at its output lights lamp LP4 through resistor R18 to indicate the latched state.

The output "1" now remains on input X0 of the 8-channel data selector so that it can be interrogated at an F2 period during a latching coil contact instruction action. This is done by the element select, slot select and chassis select codes. The chassis 0 and slot 3 signal's output "1" from AND gate 4081E in FIG. 9g is inverted in NAND gate 4011Q to apply a "0" to terminal D to enable data selector 4512C. At the same time, an element select code is applied to the data selector to retrieve the state of the latching relay at output Z.

Since only five latching coil elements are interrogated, only five of the eight channels of selector 4512C are used and are selected by the three most-significant bits (2, 4, 8) of the BCD element select code. Since the LSB is not involved in element interrogation, either of the addresses, set or reset, used for outputting to the coil element set-reset flip-flops can be used for contact linkage. However, to minimize confusion, the programmer will use the set address. Thus, the selected channel is connected from output Z to the data-in bus L for sending the state of the coil, set or reset, to the processor where it will control the F2 flip-flop in FIG. 9c.

Power off retention is obtained from a small, rechargeable battery BAT 1 shown at the lower portion of FIG. 9g. The input power is applied from the +V and (−) power terminals to the battery through a diode D4 and a resistor R19 which sets a trickle charge. When input power goes off, the diode blocks current flowing from the battery back to the power supply. Voltage to the set-reset flip-flops is then applied through resistor R19, the voltage drop being negligible because of the small amount of current involved. Isolation resistor R17 is placed between the flip-flop and the output multiplexer 4512C to minimize current flow into the input protection diodes of the multiplexer. Capacitors C10 and C11 filter then D.C. voltage.

Shutdown

During the initilization period, or if there is a significant dip in power level, the initilizing flip-flop 4013A in FIG. 9c is reset so that a "0" is applied from its Q output to shutdown bus N. As a result, this "0" goes to the input board of FIG. 9e and shifts the upper input of NAND gate 4011H from "1" to "0" to cause a "1" output therefrom to disable inverter-buffer 4502A and terminate any output therefrom. This "0" on shutdown bus N is also applied to the output board in FIG. 9f. Normally, a "1" is applied from voltage source +V in FIG. 9f through resistor R20 and inverted by inverter 4049Q to "0" for the reset terminals R of latches 4099A and 4099B. The "0" on shutdown bus N will be applied through resistor R21 to inverter 4049Q to shift the signal on reset terminals R to "1" to reset the latch. This latch will be reset because the signal on its data input D also goes to "1" by virtue of N bus signal "0" coming through gates 4023A, 4049N, 4023B and 4023C since the F1 flip-flop will be reset by the initializing flip-flop 4013A output Q̄. This Q̄ output also is applied to direct reset terminal R of flip-flop 4013D in FIG. 9b to reset the latter at the start of each operation in the event it has been set by parity error check.

The missing card bus R at the lower portion of FIG. 9d is provided to provide a shutdown "0" on shutdown bus N if a PC card is missing from the bucket. Normally, positive voltage +V is applied through the missing card bus to the cathode of diode D5 with the PC cards keeping this connection intact. If a card is missing from its slot, as indicated by the dotted portion of bus R, the positive voltage is disconnected unless a filler card is put in place of it. As a result, a "0" is applied from ground through R22 and diode D5 to shutdown bus N to shutdown the system.

A manual shutdown switch SW1 is provided in FIG. 9d. Normally, a "1" is applied from voltage source +V through resistor R23 to shutdown bus N. If the switch is closed, a "0" is applied from ground therethrough to the shutdown bus N to shut down the system. Whenever a "0" is applied on the shutdown bus N, it is inverted to "1" by inverter 4049R to light lamp LP5 as an indication of the shutdown.

Memory Power Loss Retention

Referring to the top of FIG. 9a, it will be seen that battery BAT 2 provides power loss retention of the program in the main memory MM and the parity bits in memory 6508A. Normally, power is applied from the +V1 terminal through diode D5 to power inputs 16 of the memories. This voltage is filtered by capacitors C12 and C13. This power trickle-charges the battery through resistor R24. This voltage source +V1 also applies a "1" through resistor R25 to the write terminals 14 of the main memory and parity memory chips to prevent any change in the data therein. This voltage goes from terminal +V2 to other parts of FIGS. 9a and 9b.

FO Cycle

The FO cycle or period is used for the following actions: (a) monitor a preset wire number status; (b) monitor a preset input or coil status; or (c) manually force a preset wire number to "on". In all of these cases, the wire number, input number or coil number is introduced into the controller by a manual three-digit rotary switch MS at the upper portion of FIG. 9b. This switch has three sets of contacts X1, X10 and X100, one for each decimal digit including the units, tens and hundreds digits, with four contacts in each set for BCD coding. When each rotary operator is rotated to a decimal value that is displayed, the associated set of four contacts is set to the corresponding BCD value. For each contact that is closed, a "1" is applied from voltage source +V therethrough to the corresponding manual data lines M0-M11 of channel Y.

During the FO period, 2-channel data selectors 4519AC are operated to switch the manual data channel Y into the processor. For this purpose, at time T3 in FIG. 13, decoder 4555B applies signal FO to control inputs B of the three data selectors to switch data channel Y into the processor.

Monitor Preset Wire Number

Assuming that wire number 003 in FIG. 1 is to be monitored to determine whether it is on, this number is set up on manual switch MS. During the FO period, this number is substituted by the 2-channel data selectors for the data from the main memory and is used to address the wire number memory. This preset data is also sent to the control coil memory and out to the input circuit and latching coil circuit in the I/O section of the controller. The wire number memory is enabled by decoder 4556A to read the status of the addressed wire number at output terminal 7. From there the wire number status is applied to data input terminal D of flip-flop 4013H in FIG. 9d. If wire 003 is on, this data input will be "1", and if wire 003 is off, this data will be "0". Assuming wire 003 is on, at time T5, FIG. 13, signal FO' will be inverted in inverter 4049S in FIG. 9c to a positive-going transition that will clock flip-flop 4013H at its terminal C to set state providing a "0" at its Q̄ output. This "0" will be inverted in buffer-inverter 4049T to "1" to light lamp LP6 to indicate the on status of the monitored wire number.

Alternatively, if the wire number had been off, flip-flop 4013H will be clocked to its reset state whereupon lamp LP6 will remain unlit to indicate the off status of the wire number.

Monitor Preset Input or Coil

If an input such as one of the pushbutton contacts shown in FIG. 9e, or a latching coil in FIG. 9g is to be monitored as to status, these elements will be addressed by introducing the element number on manual switch MS, the status thereof sensed and sent back on line L to the processor. Similarly, if a control coil status is to be monitored, the manual switch data will address the control coil memory in FIG. 9c, and its status sensed and applied from output terminal 7 to line L. From line L this status, "1" if on, is applied to data-in terminal D of flip-flop 4013J in FIG. 9c and this flip-flop is clocked by the FO' signal at time T5, FIG. 13, through inverter 4049S. The "0" from the Q̄ output of this flip-flop is applied through buffer-inverter 4049U to light lamp LP7 to indicate the "on" status.

Manual Wire Number Force

The controller is provided with means for manually forcing any wire number "on" in order to set a latching coil, or for maintenance purposes or the like, or to force a wire number "off" to drop out a sealed or self-maintained circuit. For this purpose, the wire number is set up on manual switches MS, a "1" or "0" signal is placed on the data input line of the wire number memory for the entire duration of the FO period, and a write signal is placed on terminal 14 of the wire number memory by the FO' signal.

The "1" (on) signal is derived from decoder 4555B in FIG. 9b and applied from its FO output for time T3 to T5 as shown in FIG. 13. This signal goes through AND gate 4081G and OR gate 4071B in FIG. 9c to data-in terminals 15 in the wire number memory. Pushbutton switch SW2 in FIG. 9c is closed to force the wire number "on". Closure of this switch substitutes the FO' signal therethrough for the "0" previously coming through resistor R26 and applies it through OR gate 4071C and NAND gate 4011J to obtain a "0" write signal to the wire number memory. The other input of NAND gate 4011J is at "1" because the output flip-flop is reset. The resultant action is that the selected wire number preset on switches MS will be forced to "on" state. If the preset wire number is 005 in FIG. 1, then, of course, the lamp will light.

Alternatively, the "0" (off) signal is derived by closing pushbutton switch SW3 in FIG. 9b to substitute a "0" for the "1" that previously came from positive voltage terminal +V through resistor R28 and applying it through AND gate 4081G and OR gate 4071B to the data inputs of the wire number memory. At the same time, pushbutton switch SW2 is closed to force the wire number "off" under the control of the FO' signal.

While the apparatus hereinbefore described is effectively adapted to fulfill the objects stated, it is to be understood that the invention is not intended to be confined to the particular preferred embodiment of programmable controller disclosed, inasmuch as it is susceptible of various modifications without departing from the scope of the appended claims.

I claim:

1. In a programmable controller:

main memory means for storing sets of instructions defining the configuration of a ladder diagram, said ladder diagram having rungs comprising numbered contacts connected in series by numbered wires such that the number of an output wire from a contact is the same as the number of an input wire to the next contact, each said instruction set comprising a contact number and an output wire number from the contact;

control means for performing AND-logic functions and storing the logic value results comprising:

a first status signal storage device;

means for setting said first status signal storage device to provide a first signal indicative of the state of the input wire to a contact;

means for reading the instructions of said sets in sequence;

a second status signal storage device;

a control clock;

a control coil memory for providing second signals indicative of the states of said contacts;

means responsive to reading of said contact number instruction for AND'ing the states of said first signal from said first status signal storage device and the respective second signal from said control coil memory and setting said second status signal storage device under said clock control to a state indicative of the AND-logic function thereof;

means responsive to said second status signal storage device and to reading of said output wire number instruction for providing a status signal indicative of the setting of said second storage device which is also indicative of the state of said output wire;

an addressable wire number memory;

and means controlled by said clock for storing said state of said output wire in said wire number memory at an address corresponding to said output wire number.

2. The programmable controller as claimed in claim 1, wherein;

said sets of instructions defining the configuration of a ladder diagram constitute unidirectional logic flowing only from the left to the right along each rung of the ladder diagram.

3. The programmable controller claimed in claim 1, wherein said control means also comprises;

means for random-access retrieving the logic values of said states of said numbered wires from said wire number memory storage based on said wire number storage addresses for use in subsequent computations.

4. The programmable controller claimed in claim 1, wherein said control means also comprises:

manual control means for forcing a selected numbered wire states logic value to "on" or "off" status in accordance with said wire number addressing for maintenance or similar purposes.

5. The programmable controller claimed in claim 1, wherein said control means also comprises:

means under manual control for retrieving and displaying the stored logic value of a selected numbered wire state with storage addresses corresponding to said wire numbers for monitoring or similar purposes.

6. The programmable controller claimed in claim 1, wherein said control means also comprises:

input signal means;

and means for computing and updating the logic value of a given numbered wire state based on the stored logic value of the next preceding numbered wire state of a series circuit portion of said ladder diagram and an input signal from said input signal means indicative of the closed-open state of a contact of said input signal means between said numbered wires of said ladder diagram.

7. The programmable controller claimed in claim 1, wherein said control means also comprises:

and I/O section comprising latching coils logic circuits;

means for setting and resetting said latching coils logic circuits;

an integral means under manual control for retrieving and displaying the logic set-reset values of selected latching coils for monitoring purposes.

8. The programmable controller claimed in claim 1, wherein said control means also comprises:

an address generator operated by said control clock for addressing said main memory to read said instructions therefrom in repeated scans;

initializing means responsive to initial application of power to said controller for inhibiting operation of said control means;

and means operable following a time delay allowing said power to rise to a predetermined value for controlling said control means so that it will start at the beginning of an address scan rather than on a random basis.

9. In a programmable controller:

main memory means for storing sets of instructions defining the configuration of a ladder diagram, each said set including the input wire number to a contact, the contact number, and the output wire number from the contact;

means for performing an AND-logic function and storing the result comprising:

means for reading said instructions in sequence;

a plurality of status signal storage devices;

a control clock;

means responsive to reading of said input wire number instruction for setting said first storage device under said clock control indicative of the "on" state of said input wire number;

means responsive to reading of said contact number instruction for setting said second storage device under said clock control indicative of the closed state of said contact provided said first storage device is set;

means responsive to the setting of said second storage device for directly setting said third storage device indicative of the "on" state of said output wire number;

an addressable wire number memory;

and means controlled by said clock for storing the "on" state of said output wire number in said wire number memory at an address corresponding to said output wire number.

10. In an addressable programmable controller:

main memory means for storing sets of instructions defining the configuration of a ladder diagram, each said set including the input wire number to an output device, a special code indicative of an output action, and the output device number;

means for performing an AND-logic function and storing the result comprising:

means for reading said instructions in sequence;

a plurality of signal storage devices;

a control clock;

a wire number memory for storing the status of said input wire number;

means responsive to reading of said input wire number instruction for retrieving the status of said input wire number from said wire number memory and, if in "on" state, setting a first one of said storage devices under said clock control;

means responsive to reading of said special code for setting a second one of said storage devices under said clock control indicative of an output action;

and means for providing an output signal under said clock control provided said first and second storage devices are set.

11. In a programmable controller:

main memory means for storing sets of instructions defining the configuration of a ladder diagram, at least one of said sets of instructions including the input wire number to an output device, a special code indicative of an output action, and the output device number;

means for performing an AND-logic function and storing the result comprising:

means for reading said instructions of said sets from said main memory in sequence;

a plurality of signal storage devices;

a control clock;

an addressable wire number memory for storing the status of said input wire number;

an addressable control coil memory for storing the status of control coils;

means responsive to reading of said input wire number instruction for retrieving the status of said input wire number from said wire number memory and, if in "on" state, setting a first one of said storage devices under said clock control;

means responsive to reading of said special code for setting a second one of said storage devices under said clock control indicative of an output action;

means for providing an output signal under said clock control provided said first and second storage devices are set;

and means responsive to said reading of said output device number instruction and responsive to said output device number being a control coil number and to said output signal for writing the "on" state of said control coil number in said control coil memory.

12. In a programmable controller, means for performing an AND/OR-logic function and storing the result comprising:

a plurality of flip-flops;

a control clock;

means for processing a first series circuit to provide an AND-logic function of state signals comprising:

means responsive to a first state signal for setting or resetting the first flip-flop under said clock control according to whether said first state signal is "1" or "0";

means responsive to a second state signal representing a serial circuit relationship with said first state signal for setting or resetting the second flip-flop under said clock control according to whether said second state signal is "1" or "0" as well as whether said first flip-flop is set or reset;

means for directly setting or not setting the third flip-flop under said clock control according to whether said second flip-flop is set or reset;

means for normally storing the state of said third flip-flop and then resetting the same under said clock control when an OR-logic function is not involved;

means responsive to an OR-logic function signal for deferring the storing of the state of said third flip-flop and for inhibiting the resetting of the latter;

means for processing a second series circuit whose output is connected to the output of said first series circuit to provide an OR-logic function comprising:

means responsive to a first state signal of said second series circuit for setting or resetting said first flip-flop under said clock control according to whether this signal is "1" or "0";

means responsive to a second state signal of said second series circuit representing a serial circuit relationship with the last mentioned signal for setting or resetting said second flip-flop according to whether this second state signal is "1" or "0" as well as whether said first flip-flop is set or reset;

means for directly setting said third flip-flop if it is in reset state or leaving it in set state if it is in set state, or not setting in according to whether said second flip-flop is set or reset;

and means for storing the state of said third flip-flop and then resetting the same under said clock control.

13. In a programmable controller:

a main memory with a ladder-diagram-defining program stored therein, said program defining said ladder diagram with sets of three, unidirectional-logic instructions such that each ladder daigram control contact and input device of a plurality thereof is defined in terms of the input wire number thereto, the control contact or input device number, and the output wire number therefrom, and each ladder diagram output element, including each control coil, of a plurality thereof is defined in terms of the input wire number to such element, a special non-addressing code indicative of an output action, and the control coil or other output element number, and said control coils being identified by numbers falling in a different range from the number range identifying input devices and other output elements;

addressable input circuits including said input devices and output circuits including said output elements having addresses corresponding to said input device numbers and said output elements numbers;

and central processing means comprising:

a control clock;

auxiliary memory means comprising an addressable wire number memory having addresses corresponding to said input wire numbers and said output wire numbers for receiving, storing and making available the on-off status of said input and output wire numbers;

an address generator operated by said clock for addressing said main memory to read said instructions therefrom in sequence;

means for applying said main memory instructions to address said auxiliary memory means including said addressable wire number memory and said addressable input and output circuits;

and logic circuit means including said auxiliary memory means comprising means controlled by said clock upon reading of said instructions of each said set in sequence for providing status signals for said input wire number and control contact or input device, means AND'ing said status signals to provide the output wire number status, means for storing said output wire number status in said wire number memory, means for retrieving the latter when the next set of instructions is read as indicative of the on-off status of the input wire number of the next series-connected control contact or input device, and means for providing an output signal to said output circuit when the last instruction set of a series circuit is read which is an output device instruction set.

14. The programmable controller claimed in claim 13, wherein:
said central processing means also comprises logic means responsive to reading of the wire-1 instruction for providing a status signal indicative that wire-1 is always "on" thereby to allow starting execution of the program without a special instruction therefor.

15. The programmable controller claimed in claim 13, wherein:
said central processing means also comprises means for monitoring the on-off status of a preset wire number comprising:
a set of manual switches pre-settable to the wire number desired to be monitored;
means responsive to said address generator for switching the instruction from said set of manual switches for addressing said wire number memory;
and means responsive to said control clock for displaying the on-off status of the addressed wire number.

16. The programmable controller claimed in claim 13, wherein:
said central processing means also comprises means for monitoring the on-off status of a preset input device number comprising:
a set of manual switches pre-settable to the input device number desired to be monitored;
means responsive to said address generator for switching the instruction from said set of manual switches for addressing said input device in said input circuit;
and means responsive to said control clock for displaying the on-off status of the addressed input device.

17. The programmable controller claimed in claim 13, wherein:
said central processing means also comprises means for manually forcing any preset wire number "on" thereby to afford monitoring of the operability thereof or to set up latching coils connected thereto when restarting from an interrupted condition comprising:
a set of manual switches pre-settable to the wire number desired to be forced "on";
means responsive to said address generator for switching the instruction from said set of manual switches for addressing said wire number memory;
a manual directive switch;
and means responsive to said control clock and said manual directive switch for storing an "on" status in the addressed location of said wire number memory.

18. The programmable controller claimed in claim 13, wherein:
said auxiliary memory means also comprises an addressable control coil memory having addresses corresponding to said control coil numbers;
and said logic circuit means comprises means controlled by said clock upon reading of a control coil output element instruction set for providing an on-off status signal for the addressed control coil and for storing the same in said control coil memory.

19. The programmable controller claimed in claim 18, wherein:
said central processing means also comprises means for monitoring the on-off status of a preset control coil number comprising:
a set of manual switches pre-settable to the control coil number desired to be monitored;
means responsive to said address generator for switching the instruction from said set of manual switches for addressing said control coil memory;
and means responsive to said control clock for displaying the on-off status of the addressed control coil.

20. The programmable controller claimed in claim 13, wherein:
said central processing means also comprises means for manually forcing any preset wire number "off" thereby to afford monitoring of the operability thereof or to drop out a sealed or self-maintained circuit;
a set of manual switches pre-settable to the wire number desired to be forced "off";
means responsive to said address generator for switching the instruction from said set of manual switches for addressing said wire number memory;
manual directive switch means;
and means responsive to said control clock and to operation of said manual directive switch means for restoring an "off" status in the addressed location of said wire number memory.

21. The programmable controller claimed in claim 13, wherein:
said ladder-diagram-defining program also includes along with said control contact number a data bit flagging the normal condition of said control contact as to normally-open or normally-closed;
and means in said logic circuit means responsive to said data bit for inverting said control contact signal under one of said conditions of normally-open and normally-closed.

* * * * *